US009692811B1

(12) United States Patent
Tajuddin et al.

(10) Patent No.: US 9,692,811 B1
(45) Date of Patent: Jun. 27, 2017

(54) OPTIMIZATION OF APPLICATION PARAMETERS

(71) Applicant: Amazon Technologies, Inc., Seattle, WA (US)

(72) Inventors: Brian Jaffery Tajuddin, Seattle, WA (US); Carlos Alejandro Arguelles, Shoreline, WA (US); Jeremy Boynes, Mercer Island, WA (US); Adam Lloyd Days, Tacoma, WA (US); Gavin R. Jewell, Seattle, WA (US); Erin Harding Kraemer, Seattle, WA (US); Jeenandra Kumar Uttamchand, Redmond, WA (US); Manoj Srivastava, Mercer Island, WA (US); Tyson Christopher Trautmann, Seattle, WA (US); Praveen Kambam Sugavanam, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 366 days.

(21) Appl. No.: 14/286,539

(22) Filed: May 23, 2014

(51) Int. Cl.
 G06F 15/16 (2006.01)
 H04L 29/08 (2006.01)
(52) U.S. Cl.
 CPC .................... H04L 67/10 (2013.01)
(58) Field of Classification Search
 CPC .................................... H04L 43/50
 USPC .......................................... 709/201
 See application file for complete search history.

(56) References Cited

U.S. PATENT DOCUMENTS

| 6,981,180 B1* | 12/2005 | Bailey ................ H04L 41/145 714/38.11 |
| 7,757,214 B1* | 7/2010 | Palczak ................. G06F 9/5083 709/223 |
| 8,250,538 B2 | 8/2012 | Kashyap et al. |
| 2002/0023251 A1* | 2/2002 | Nasr ..................... G06Q 10/06 716/136 |

(Continued)

OTHER PUBLICATIONS

U.S. Appl. No. 13/238,867, filed Sep. 21, 2011, Brandwine et al.
(Continued)

*Primary Examiner* — Kevin Bates
*Assistant Examiner* — Clarence McCray
(74) *Attorney, Agent, or Firm* — Lee & Hayes, PLLC

(57) ABSTRACT

Optimization preferences are defined for optimizing execution of a distributed application. Candidate sets of application parameter values may be tested in test execution environments. Measures of performance for metrics of interest are determined based upon the execution of the distributed application using the candidate sets of application parameter values. Utility curves may be utilized to compute measures of effectiveness for metrics of interest. A multi-attribute rollup operation may utilize the computed measures of effectiveness and weights to compute a grand measure of merit (MOM) for the candidate sets of application parameter values. An optimized set of application parameter values may then be selected based upon the computed grand MOMs. The optimized set of application parameter values may be deployed to a production execution environment executing the distributed application. Production safe application parameters might also be identified and utilized to optimize execution of the distributed application in a production execution environment.

18 Claims, 12 Drawing Sheets

(56) References Cited

U.S. PATENT DOCUMENTS

| | | |
|---|---|---|
| 2002/0152305 A1 | 10/2002 | Jackson et al. |
| 2003/0112800 A1 | 6/2003 | Grech et al. |
| 2004/0015600 A1 | 1/2004 | Tiwary et al. |
| 2004/0230404 A1* | 11/2004 | Messmer ............... G06Q 10/00 703/1 |
| 2006/0090136 A1 | 4/2006 | Miller et al. |
| 2007/0100776 A1* | 5/2007 | Shah ................... G06Q 30/0283 705/400 |
| 2008/0127084 A1 | 5/2008 | Sattler et al. |
| 2008/0271019 A1 | 10/2008 | Stratton et al. |
| 2008/0271025 A1* | 10/2008 | Gross ................. G06F 11/3051 718/102 |
| 2009/0319647 A1 | 12/2009 | White et al. |
| 2010/0125477 A1 | 5/2010 | Mousseau et al. |
| 2010/0179794 A1* | 7/2010 | Shah ....................... G06F 17/50 703/6 |
| 2010/0257513 A1 | 10/2010 | Thirumalai et al. |
| 2011/0088022 A1 | 4/2011 | Kruglick |
| 2011/0307899 A1 | 12/2011 | Lee et al. |
| 2012/0072781 A1* | 3/2012 | Kini .................... G06F 11/0766 714/47.3 |
| 2012/0324097 A1* | 12/2012 | Myers ................. G06F 11/3452 709/224 |
| 2014/0025412 A1* | 1/2014 | Chee .................... G06Q 10/063 705/7.11 |

OTHER PUBLICATIONS

U.S. Official Action dated Apr. 10, 2013 in U.S. Appl. No. 13/238,867, filed Sep. 21, 2011, first named inventor: Eric J. Brandwine.

U.S. Official Action dated Nov. 6, 2013 in U.S. Appl. No. 13/238,867, filed Sep. 21, 2011, first named inventor: Eric J. Brandwine.

* cited by examiner

MULTI-ATTRIBUTE UTILITY ROLLUP

MULTI-ATTRIBUTE UTILITY ROLLUP

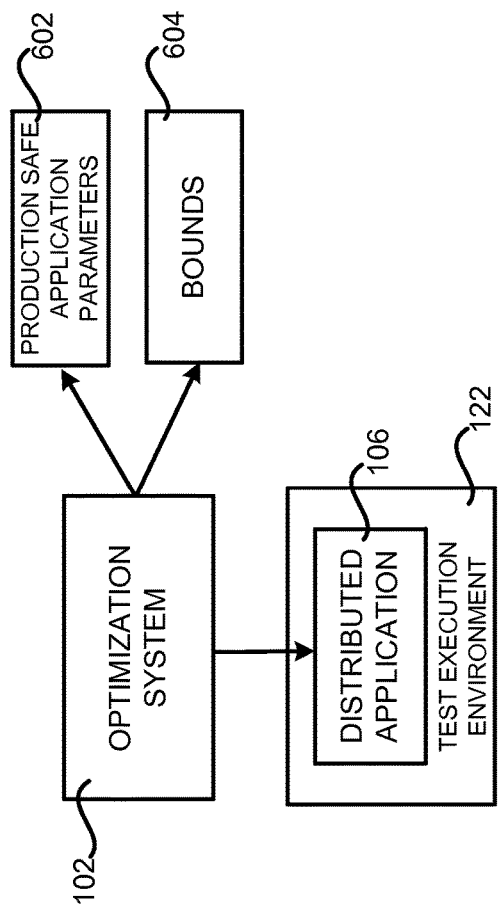
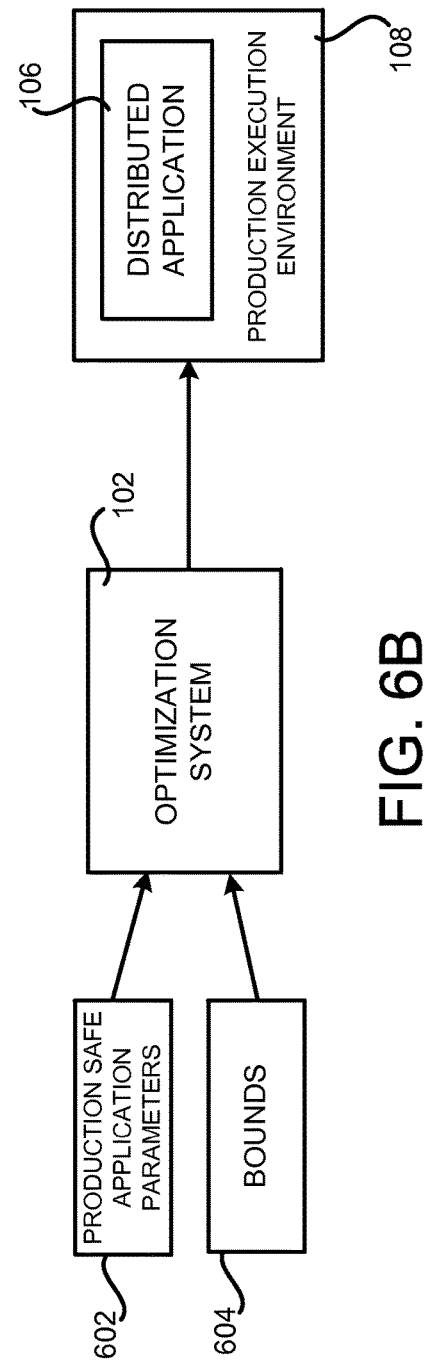
FIG. 6A
FIG. 6B

OPTIMIZATION OF APPLICATION PARAMETERS

BACKGROUND

Distributed applications can be highly complex. For instance, it is not uncommon for distributed applications to be configured to execute and/or utilize many hundreds of different types of services on many different host computers and/or virtual machine instances. Due to this complexity, many different types of factors might influence the performance of a distributed application. Consequently, it may be difficult to optimize the execution of a distributed application.

Different individuals within an organization might also have different ideas about what it means for a distributed application to be optimized. For example, one individual may desire to optimize execution of a distributed application for responsiveness (i.e. low latency), while another individual may desire to optimize execution of the same distributed application to minimize the monetary cost of executing the application. In this example, for instance, it may not be possible to optimize execution of the distributed application to minimize both cost and latency. Consequently, for this reason and others, it may be very difficult to optimize the execution of certain types of distributed applications.

It can also be difficult to optimize the execution of distributed applications that require high availability (i.e. uptime) because optimization of an application often involves experimentation. The possibility of downtime that might be caused by such experimentation, however, often outweighs the possible benefits that might be achieved from optimizing the execution of the distributed application. As a result, the execution of some types of distributed applications that require high availability is not optimized.

It is with respect to these and other considerations that the disclosure made herein is presented.

BRIEF DESCRIPTION OF THE DRAWINGS

FIGS. 6A and 6B are computer system diagrams illustrating aspects of one mechanism disclosed herein for identifying production safe application parameters and for utilizing the identified production safe application parameters to optimize the execution of a distributed application within a production execution environment, according to one embodiment disclosed herein;

DETAILED DESCRIPTION

Figure 1:
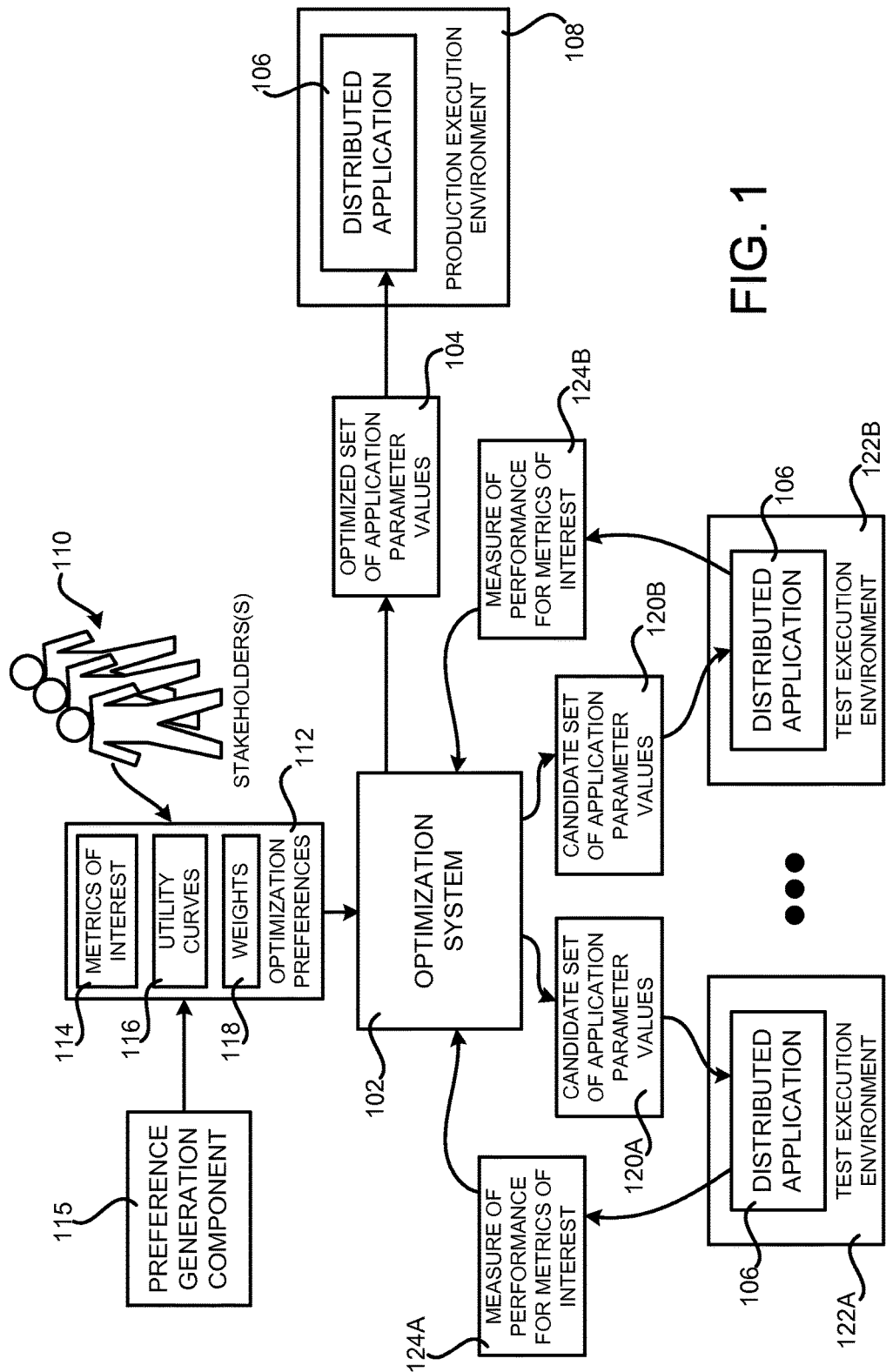
FIG. 1 is a computer system diagram showing aspects of the implementation and operation of an optimization system that provides functionality for optimizing the execution of a distributed application, according to one embodiment disclosed herein.

The following detailed description is directed to technologies for optimizing the execution of a distributed application. Utilizing the technologies described herein, the execution of distributed applications, including high-availability distributed applications, can be optimized to improve performance, reduce resource consumption, and/or to achieve other business and/or technical goals, even when optimization preferences supplied by different individuals, who may be referred to herein as "stakeholders", are conflicting. Additionally, the execution of distributed applications can be optimized utilizing the mechanisms disclosed herein within a production execution environment with a reduced risk of application downtime.

According to one embodiment disclosed herein, a distributed application is configured to consume various parameters (referred to herein as "application parameters") that control aspects of the operation of the distributed application. For example, an administrator of the distributed application might specify values for the application parameters to configure aspects of the operation of a distributed application such as, without limitation, the number of listener processes on a host, cache memory size, timeout values, central processing unit ("CPU") utilization, memory usage, acceptable error rates, and other types of application parameters.

The values of the application parameters may impact various aspects of the execution and performance of the distributed application. For example, and without limitation, the values of the application parameters might impact the responsiveness of the application, the type and amount of computing resources utilized by the application, the amount of power consumed by computers executing the application, and/or other aspects of the operation of the application. It may, therefore, be desirable to optimize the values of the application parameters to meet certain criteria.

In order to address the considerations set forth above, and potentially others, an optimization system is provided in one embodiment that is configured to optimize the execution of a distributed application. In order to provide this functionality, optimization preferences are received from one or more stakeholders of the distributed application. A "stakeholder" is an organization, individual, or group of individuals that has an interest in the manner in which the distributed application is executed. For example, a stakeholder might be an engineer tasked with ensuring that a distributed application executes properly with minimal downtime. Another stakeholder might be a business executive tasked with maximizing the revenue generated by a distributed application (i.e. where the distributed application provides e-commerce functionality). Other types of stakeholders and/or groups of stakeholders might also supply optimization preferences for use in optimizing the execution of a distributed application.

Each of the stakeholders might utilize the optimization preferences to express their preferences regarding the manner in which the distributed application is to be executed. For example, in one implementation the optimization preferences identify one or more metrics of interest to a stakeholder. For instance, one stakeholder might identify one or more metrics of interest relating to measures of latency for the distributed application. Another stakeholder, or stakeholders, might identify one or more metrics of interest relating to CPU utilization by the distributed application. Another stakeholder, or stakeholders, might similarly specify other metrics of interest relating to other aspects of the performance of the distributed application.

The optimization preferences supplied by the stakeholders might also define or identify one or more utility curves for the metrics of interest. Each utility curve defines a relationship between a measure of performance for a metric of interest (e.g. an actual measure of latency during execution of the distributed application) and a measure of effectiveness for the metric of interest (i.e. an indication of the effectiveness of the measure of performance). The optimization preferences might also define one or more weights for use in weighting the measures of effectiveness for the metrics of interest and, ultimately, computing a grand measure of merit ("MOM") that expresses numerically how well a particular set of application parameter values optimize the execution of the distributed application. Additional details regarding this process will be provided below with regard to FIGS. 1-5.

In order to identify optimized values for the application parameters, the optimization system generates or identifies candidate sets of application parameter values. The distributed application is then configured to execute in test execution environments using the candidate sets of application parameter values. The test execution environments are execution environments that are not configured to receive live network traffic (e.g. a test execution environment for an e-commerce distributed application would not receive live customer network traffic). Based upon the execution of the distributed application using the candidate sets of application parameter values, measures of performance are determined for the various metrics of interest. The associated utility curve can then be utilized to compute a measure of effectiveness for each of the metrics of interest for each of the sets of candidate application parameter values.

In some embodiments, a multi-attribute utility rollup operation is performed utilizing the computed measures of effectiveness and the weights specified by the stakeholders in order to generate a grand MOM for each candidate set of application parameter values. As mentioned above, the grand MOM expresses numerically how well a particular set of application parameter values optimizes the execution of the distributed application. The process described above may then be repeated for additional candidate sets of application parameter values. The candidate sets of application parameter values might be selected using "hill climbing" algorithms or other algorithms for optimizing a set of values.

An optimized set of application parameter values may be selected from the candidate sets of application parameter values based, at least in part, upon the grand MOMs computed for the candidate sets of application parameter values in the manner described above. For example, the candidate set of application parameter values having the highest grand MOM may be chosen as the optimized set of application parameter values. The optimized set of application parameter values may then be deployed for use by the distributed application in a production execution environment (i.e. an environment that receives live incoming network traffic, such as actual customer traffic in the case of a distributed application that provides e-commerce functionality). The test execution environments and the production execution environment are implemented utilizing a programmable execution service ("PES") platform in some embodiments, which will be described in detail below with regard to FIGS. 9-11. Additional details regarding the optimization process described above will be presented below with regard to FIGS. 2-5.

In some embodiments, the process described above for optimizing application parameter values for a distributed application may be performed in a production execution environment rather than a test execution environment. In order to provide this functionality and, at the same time, minimize the possibility of downtime in the production execution environment, testing may be performing in a test execution environment to identify one or more "production safe" application parameters for the distributed application.

Production safe application parameters are application parameters and associated values that are not likely to create a failure case or to create another type of undesirable condition that is unacceptable to the operator of the distributed application that is being optimized in the production execution environment. For example, testing of application parameters in a test execution environment might indicate that modification of a certain application parameter negatively impacts some aspect of the operation of the distributed application in an unacceptable fashion. Consequently, this application parameter might be categorized as a "production unsafe" application parameter for which optimization is not to be performed in a production execution environment. Other application parameters for which modification is not likely to create an unacceptable failure case or other type of undesired condition for a distributed application executing in a production execution environment may be considered production safe.

Bounds of values for the production safe application parameters might also be identified using a test execution environment in some embodiments. The bounds identify a range of application parameter values that are safe to be modified when testing a production safe application parameter in a production execution environment. For example, the bounds might identify a low value and a high value for a production safe application parameter. Optimization of the distributed application by modification of the value of a production safe application parameter between the low value and the high value may be considered safe. Utilization of application parameter values lower than the low value or higher than the high value may cause problems with the execution of the distributed application in the production execution environment.

When optimization is performed in a production execution environment in the manner described above, the results of the testing might impact how optimized application parameter values are deployed to host computers and/or virtual machine instances executing the distributed application in the production execution environment. For example, if testing indicates that a set of application parameter values provides a positive impact on the execution of the distributed application, then that set of application parameters might be deployed to additional host computers and/or virtual machine instances as testing progresses. On the other hand, if the testing of a set of application parameter values indicates a negative influence on some aspect of the operation of the distributed application, deployment of the application parameter values might be rolled back, and further optimization might be discontinued or other types of corrective actions might be taken. Additional details regarding the process described above for performing optimization of application parameter values for a distributed application in a production execution environment will be presented below with regard to FIGS. 6A, 6B and 7.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several FIGS.

FIG. 1 is a computing system diagram showing aspects of the operation of an optimization system 102 utilized in various embodiments disclosed herein. As discussed briefly above, the optimization system 102 provides functionality for optimizing the execution of a distributed application 106. As also discussed above, the functionality described herein as being performed by the optimization system 102 might be provided by another component or combination of components in other implementations.

In one embodiment disclosed herein, the optimization system 102 is configured to provide functionality for allowing an owner, operator, maintainer or other entity associated with a distributed application 106 to optimize the execution of the application 106. In one embodiment, the functionality described herein for optimizing the execution of a distributed application 106 is performed in response to a request to optimize execution, such as but not limited to, from an owner or operator of the distributed application 106. For instance, a system administrator might provide a request to optimize the execution of the distributed application 106 by way of a system management interface exposed by the optimization system 102 or other component. In other embodiments, the functionality presented herein might be performed in response to other events, like the check-in of source code for an update to the distributed application 106 to a source code management system, the deployment of an update to the distributed application 106, deployment of new computing resources for executing the distributed application 106, a change in certain external parameters such as the pricing of computing resources for executing the distributed application 106, a degradation in performance of the distributed application 106, or in response to other types of events.

As discussed briefly above, the distributed application 106 that is being optimized is configured to consume one or more application parameters that control various aspects of the operation of the distributed application 106. For instance, an administrator of the application might specify values for the application parameters to configure aspects of the operation of the distributed application 106 such as the number of listener processes on a host, cache memory size, timeout values, CPU utilization, memory usage, and acceptable error rates. Values for the application parameters might be specified to control other aspects of the operation of the distributed application 106. As will be described in detail below, the optimization system 102 is configured to generate an optimized set of application parameter values 104 (which may be referred to herein as "optimized values") for the application parameters utilized by the distributed application 106. Details of the operation of the optimization system 102 in this regard will be provided below.

In one embodiment, the optimization system 102 receives optimization preferences 112 from one or more stakeholders 110 of the distributed application 106. As used herein, the term "stakeholder" refers to an organization, individual, or group of individuals that has an interest in the manner in which the distributed application 106 is executed. For example, a stakeholder 110 might be an engineer tasked with ensuring that the distributed application 106 executes properly with minimal downtime. Another stakeholder 110 might be a business executive tasked with maximizing the revenue generated by a distributed application 106 (i.e. where the distributed application provides e-commerce functionality). Other types of stakeholders 110 and/or groups of stakeholders 110 might also supply optimization preferences 112 for use in optimizing the execution of a distributed application 106 in the manner described below. A user interface ("UI"), application programming interface ("API"), or another mechanism may be provided through which the stakeholders 110 may supply the optimization preferences 112.

Each of the stakeholders 110 might utilize the optimization preferences 112 to express their preferences regarding the manner in which the distributed application 106 is to be executed. For example, in one implementation the optimization preferences 112 identify one or more metrics of interest 114 to a stakeholder 110. For instance, one stakeholder 110 might identify one or more metrics of interest 114 relating to measures of latency for the distributed application 106. Another stakeholder 110, or stakeholders 110, might identify one or more metrics of interest 114 relating to CPU utilization by the distributed application 106. Another stakeholder 110, or stakeholders 110, might similarly specify other metrics of interest 114 relating to other aspects of the performance of the distributed application 106.

It should be appreciated that certain stakeholders 110 might be permitted to specify certain metrics of interest 114 in the optimization preferences 112 that cannot be specified by other stakeholders 110. The metrics of interest 114 specifiable by each stakeholder 110 might be determined based upon various factors including, but not limited to, a stakeholder's security credentials, level within an organization, or other factors. It should also be appreciated that different stakeholders 110 might identify the same metrics of interest 114 for use in optimizing the execution of the distributed application 106.

The optimization preferences 112 supplied by the stakeholders 110 might also define or identify one or more utility curves 116 for the specified metrics of interest 114. Each utility curve 116 defines a relationship between a measure of performance for a metric of interest 114 (e.g. an actual measure of latency during execution of the distributed application 106) and a measure of effectiveness for the metric of interest 114 (i.e. an indication of the effectiveness of the measure of performance). Additional details regarding the utility curves 116 will be provided below with regard to FIG. 2.

The optimization preferences 112 might also define one or more weights 118 for use in weighting the computed measures of effectiveness for the metrics of interest 114 and, ultimately, computing a grand MOM that expresses numerically how well a particular set of application parameter values optimize the execution of the distributed application 106. Additional details regarding a multi-attribute utility rollup operation for computing a grand MOM will be described below with regard to FIGS. 3A and 3B. It should be appreciated that the weights may be specified as static weights (i.e. a static numerical value) or as dynamic weights. Dynamic weights might be determined at runtime based upon test characteristics and/or other factors.

In some embodiments, a preference generation component 115 is configured to generate some or all of the optimization preferences 112. For example, and without limitation, the preference generation component 115 might be a software or hardware component configured to generate utility curves 116 and/or weights 118. The preference generation component 115 might utilize various mechanisms to generate utility curves 116 and/or weights 118 such as, but not limited to, data describing the actual performance (e.g. latency, resource utilization, usage cost, etc.) of the distributed application 106 in the production execution environment 108, machine learning, and others. In this way, the preference generation component 115 might periodically adjust the utility curves 116 and/or weights 118 based upon feedback received from the distributed application 106. In some embodiments, the preference generation component 115 is integrated with the optimization system 102. The preference generation component 115 might also be implemented in other ways in other embodiments.

In order to identify optimized values for the application parameters consumed by the distributed application 106, the optimization system 102 generates or identifies candidate sets of application parameter values 120. In one embodiment, at least one of the candidate sets of application parameter values 120 is a current set of application parameter values utilized by the distributed application 106 in the production execution environment 108. The distributed application 106 is then configured to execute in test execution environments 122 using the candidate sets of application parameter values 120. The test execution environments 122 are execution environments that are not configured to receive live network traffic (e.g. a test execution environment 122 for an e-commerce distributed application would not receive live customer network traffic). For example, in FIG. 1, the distributed application 106 has been configured to execute in the test execution environment 122B using the candidate set of application parameter values 120B. Similarly, the distributed application 106 has been configured to execute in the test execution environment 122A using the candidate set of application parameter values 120A.

The test execution environments 122 and the production execution environment 108 are implemented utilizing a PES platform in some embodiments. As discussed briefly above, the PES platform can provide various types of computing resources on demand. Additional details regarding configuration and operation of a PES platform utilized will be described in detail below with regard to FIGS. 9-11. Other details regarding the configuration and operation of a test execution environment for testing the operation of a distributed application and for optimizing the performance of a distributed application can be found in U.S. patent application Ser. No. 13/238,867, entitled "Optimizing the Execution of an Application Executing on a Programmable Execution Service", which was filed on Sep. 21, 2011, and which is expressly incorporated by reference herein in its entirety.

In one embodiment, the test execution environments 122 are configured similarly to the production execution environment 108 by replicating aspects of the production execution environment 108, such as computing resources, networks, and software components contained therein. Additionally, live network traffic directed to the production execution environment 108 might be replicated and routed to the test execution environments 122 for use during the optimization processes described herein.

As mentioned briefly above, the production execution environment 108 is an execution environment for the distributed application 106 that receives live incoming network traffic, such as actual customer network traffic in the case of a distributed application 106 that provides e-commerce functionality. By performing the optimization processes disclosed herein in test execution environments 122 that are similarly configured to the production execution environment 108 for the distributed application 106, the possibility of downtime to the distributed application 106 executing in the production execution environment 108 is eliminated. An additional mechanism for performing optimization within the production execution environment 108, while still minimizing the possibility of application downtime, is described below with regard to FIGS. 6A, 6B and 7.

Based upon the execution of the distributed application 106 in the test execution environments 122 using the candidate sets of application parameter values 120, measures of performance 124 are determined for the various metrics of interest 114. For example, the measure of performance 124A might reflect the actual latency observed in the test execution environment 122A when the distributed application 106 is executed using the candidate set of application parameter values 120A. Similarly, the measure of performance 124B might reflect the actual CPU utilization observed in the test execution environment 122B when the distributed application 106 is executed using the candidate set of application parameter values 120A. The measure of performance for each of the metrics of interest 110 specified in the optimization preferences 112 may be observed in this way.

It should be appreciated that different test environments 122A-122B might be configured similarly or differently depending upon the type of testing that is being performed. For example, in one embodiment, the same candidate set of application parameter values 120 might be evaluated in test environments 122 with different configurations. In this way, A/B testing can be performed to determine an optimized test environment 122 for the same candidate set of application parameter values 120. In another embodiment, different candidate sets of application parameter values 120 might be tested within similarly configured test environments 122. Other configurations might also be utilized.

Once the measures of performance for the metrics of interest 124 have been observed for the candidate sets of application parameter values 120, the utility curves 116 can be utilized to compute measures of effectiveness for each of the metrics of interest 114. In some embodiments, the optimization system 102 then performs a multi-attribute utility rollup operation utilizing the computed measures of effectiveness and the weights 118 specified by the stakeholders 110 in order to generate a grand MOM for each candidate set of application parameter values 120. As mentioned above, the grand MOM expresses numerically how well a particular candidate set of application parameter values 120 optimizes the execution of the distributed application 106.

The process described above may then be repeated for additional candidate sets of application parameter values 120. For instance, a "hill climbing" algorithm is utilized in one embodiment to vary the values in the candidate sets of application parameter values 120. In other embodiments, a Monte Carlo simulation is utilized to identify the candidate sets of application parameter values 120. Simulated annealing might also be utilized to identify candidate sets of application parameter values 120 in other embodiments. Other types of optimization techniques might also be utilized in other embodiments. Additionally, combinations of the optimization techniques described above and other optimization techniques might also be utilized to identify the optimized set of application parameter values 104.

The optimization system 102 may continue iterating in the manner described above until an optimized set of application parameter values 104 have been identified or the optimization system 102 has exhausted the possible candidate sets of application parameter values 120 without finding an optimized set of application parameter values 104. In one embodiment, an administrator can specify how the optimization system 102 iterates through candidate sets of application parameter values 120. For instance, an administrator might specify a minimum value and a maximum value for certain application parameters. The optimization system 102 may then create candidate sets of application parameter values 120 containing the specified minimum and maximum values. Other mechanisms might also be utilized.

The optimization system 102 may select an optimized set of application parameter values 104 from the candidate sets of application parameter values 120 based, at least in part, upon the grand MOMs computed for the candidate sets of application parameter values 120 in the manner described above. For example, the candidate set of application parameter values 120 having the highest grand MOM may be chosen as the optimized set of application parameter values 104. The optimized set of application parameter values 104 may then be deployed for use by the distributed application 106 in the production execution environment 108 (i.e. an environment that receives live incoming network traffic, such as actual customer traffic in the case of a distributed application that provides e-commerce functionality). In this manner, the optimization system 102 can utilize one or more test execution environments 122 to perform optimization processes that will not impact the execution of the distributed application 106 in the production execution environment 108.

In some embodiments, the process described above for optimizing application parameter values for a distributed application 106 is performed in the production execution environment 108 rather than the test execution environments 122. In order to provide this functionality and, at the same time, minimize the possibility of downtime in the production execution environment, one or more "production safe" application parameters for the distributed application 106 might be identified and utilized during optimization of the distributed application 106 in the production execution environment 108. Additional details regarding one process for optimizing application parameter values for a distributed application 106 in a production execution environment 108 will be presented below with regard to FIGS. 6A, 6B and 7.

Figure 2:
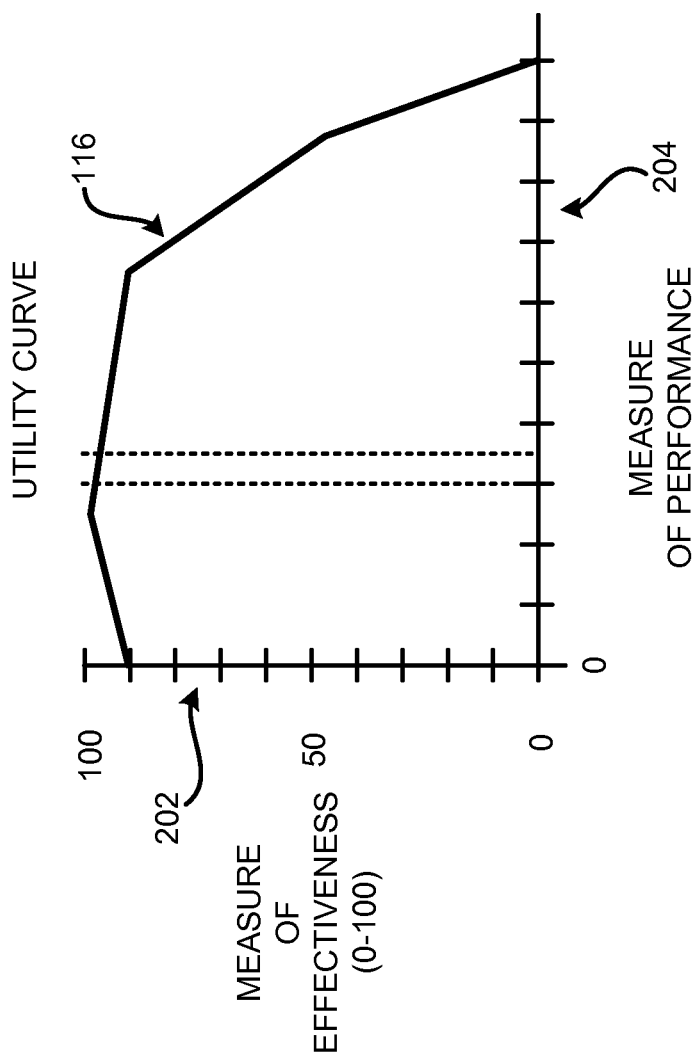
FIG. 2 is a graph diagram showing aspects of a utility curve utilized in embodiments disclosed herein for optimizing the execution of a distributed application that defines a relationship between a measure of performance and a measure of effectiveness.

FIG. 2 is a graph diagram showing aspects of a utility curve 116 that defines a relationship between a measure of performance and a measure of effectiveness in one embodiment disclosed herein. As discussed briefly above with regard to FIG. 1, the optimization preferences 112 supplied by the stakeholders 110 might also define or identify one or more utility curves 116 for the specified metrics of interest 114. As shown in FIG. 2, a utility curve 116 defines a relationship between a measure of performance for a metric of interest 114 (e.g. an actual measure of latency or CPU utilization measured during execution of the distributed application 106) and a measure of effectiveness for the metric of interest 114 (i.e. an indication of the effectiveness of the measure of performance as defined by a stakeholder 110).

In the example shown in FIG. 2, the measure of performance is expressed on the x-axis 204 of the utility curve 116. The units expressed on the x-axis of the utility curve 116 are the units of a metric of interest 114. For example, if the utility curve 116 defines the measure of effectiveness for a metric of interest 114 relating to latency, the units for the x-axis 204 may be milliseconds (or some other time-based measure). If the utility curve 116 defines the measure of effectiveness for a metric of interest 114 relating to CPU utilization, the units for the x-axis 204 may be a percentage from 0-100. Other units might be used on the x-axis 204 for other types of metrics of interest 114.

The measure of effectiveness for a given metric of interest 114 is expressed on the y-axis 202 of the utility curve 116. The measure of effectiveness is expressed between 0-100, where 0 is the lowest effectiveness and 100 is the highest. In this way, the utility curve 116 expresses a relationship between a measure of performance (expressed on the x-axis 204) and a measure of effectiveness (expressed on the y-axis 202).

The utility curve 116 may be utilized to define the measure of performance for a particular metric of interest 114 that satisfies the requirements of the stakeholder 110, or stakeholders 110. For instance, in the example utility curve 116 shown in FIG. 2, the dashed lines indicate a range of performance that is acceptable to the stakeholders 110. As will be described below with regard to FIGS. 3A, 3B, 4 and 5, the measures of performance for the metrics of interest 124, the utility curves 116, and the weights 118 may be utilized in a multi-attribute utility rollup operation to compute a grand MOM for each of a plurality of candidate sets of application parameter values 120. The computed grand MOMs may then be utilized to select one of the candidate sets of application parameter values 120 as an optimized set of application parameter values 104 for deployment to the distributed application 106 in the production execution environment 108.

Figure 3A:
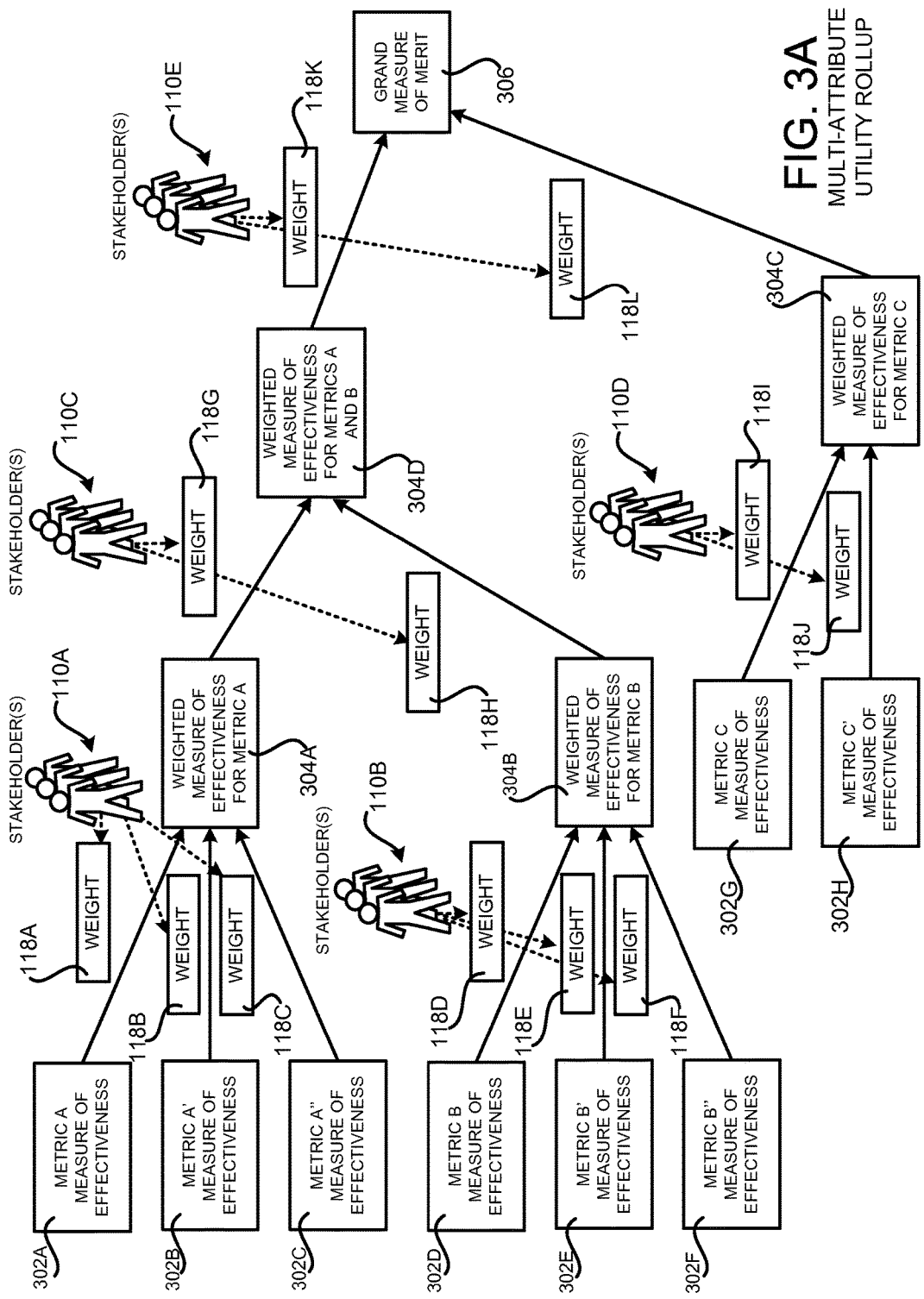
FIGS. 3A and 3B are tree diagrams showing aspects of an example of a multi-attribute utility rollup operation utilized to optimize aspects of the execution of a distributed application in various embodiments disclosed herein.
Figure 3B:
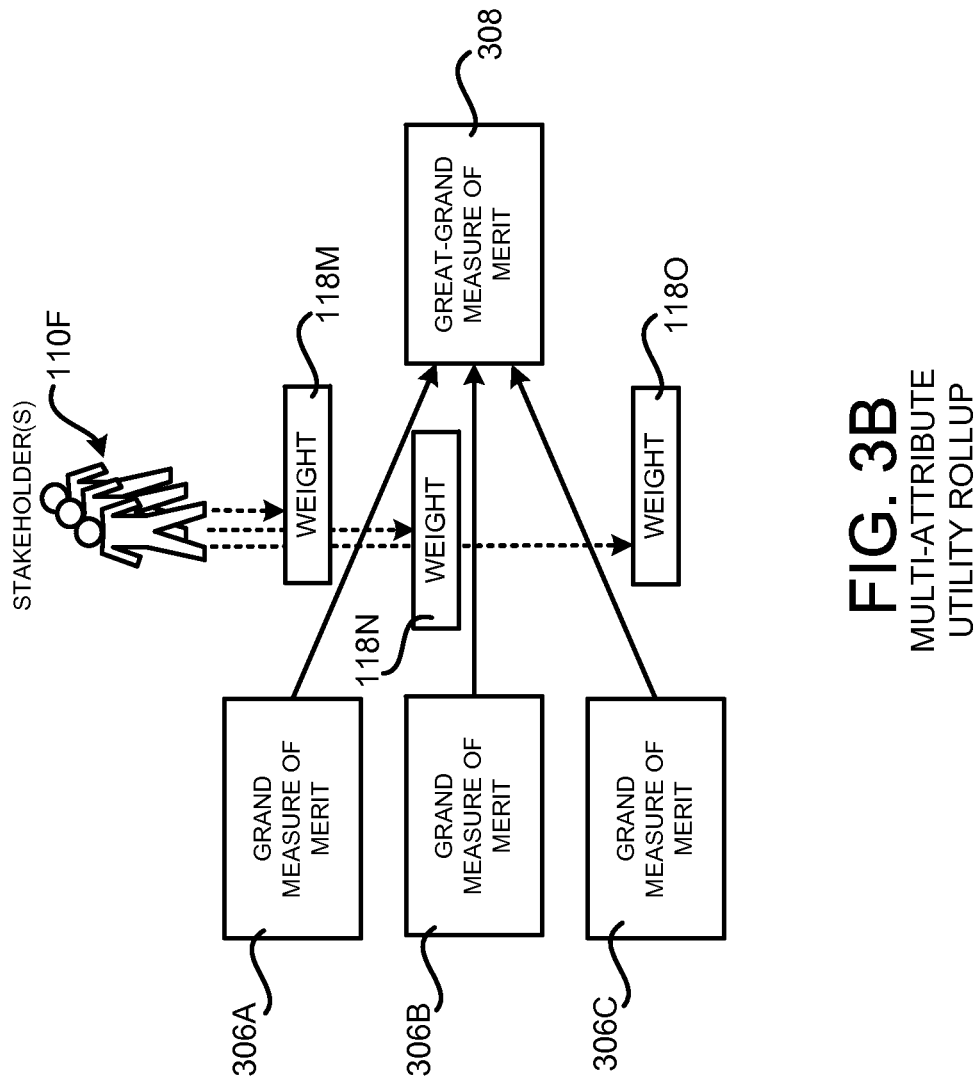

FIGS. 3A and 3B are tree diagrams showing aspects of an example multi-attribute utility rollup operation utilized to optimize aspects of the execution of the distributed application 106 in one embodiment disclosed herein. As shown in FIGS. 3A and 3B, and discussed above, the optimization system 102 may apply a candidate set of application parameter values 120 to the distributed application 106 in a test execution environment 122. The optimization system 102 may then observe measures of performance 124 for the metrics of interest 114. The optimization system 102 may then utilize the utility curves 116 to determine a metric of effectiveness 302 for each of the metrics of interest 114 in the manner described above with regard to FIG. 2.

In the example shown in FIG. 3A, for instance, the stakeholders 110A have specified three metrics of interest 114 (A, A', and A", relating to latency, for example). Consequently, the optimization system 102 has computed three measures of effectiveness 302A-302C for the specified metrics of interest 114. Similarly, the stakeholders 110B have also specified three metrics of interest 114 (B, B', and B", relating to CPU utilization, for example). Consequently, the optimization system 102 has computed three measures of effectiveness 302D-302F for the specified metrics of interest 114. Likewise, the stakeholders 110D have specified two metrics of interest 114 (C and C', relating to memory utilization, for example). Consequently, the optimization system 102 has computed measures of effectiveness 302G and 302H for the specified metrics of interest 114.

As also discussed above, the stakeholders 110 might also specify weights 118 for use in the multi-attribute utility operation shown in FIGS. 3A and 3B. For instance, in the example shown in FIG. 3A, the stakeholders 110A have specified the weights 118A-118C for the metrics of effectiveness 302A-302C. The sum of the weights 118 for a given set of measures of effectiveness 302 is equal to one, in one embodiment. For example, the sum of the weights 118A-118C may be equal to one.

The stakeholders 110B have specified the weights 118D-118F corresponding to the measures of effectiveness 302D-302F, the stakeholders 110C have specified the weights 118G and 118H, the stakeholders 110D have specified the weights 118I and 118J, and the stakeholders 110E have specified the weights 118K and 118L. The use of the weights 118 will be described in one detail below.

In one embodiment, weighted measures of the effectiveness for some of the metrics of interest 114 are also computed. For instance, in the example shown in FIG. 3A, a weighted measure of effectiveness 304A for the measures of effectiveness 302A-302C (i.e. metrics of interest 114 relating to latency) is computed by summing the product of the measure of effectiveness 302A and the weight 118A, the product of the measure of effectiveness 302B and the weight 118B, and the product of the measure of effectiveness 302C and the weight 118C. Similarly, a weighted measure of effectiveness 304B for the measures of effectiveness 302D-302F (i.e. metrics of interest 114 relating to CPU utilization) is computed by summing the product of the measure of effectiveness 302D and the weight 118D, the product of the measure of effectiveness 302E and the weight 118E, and the product of the measure of effectiveness 302F and the weight 118F. Likewise, a weighted measure of effectiveness 304C for the measures of effectiveness 302G and 302H (for metrics of interest 114 relating to memory utilization) is computed by summing the product of the measure of effectiveness 302G and the weight 118I and the product of the measure of effectiveness 302H and the weight 118J.

An additional weighted measure of effectiveness 304D might also be computed in some embodiments. For instance, in the example shown in FIG. 3A, a weighted measure of effectiveness 304D for metrics of interest 114 relating to latency and CPU utilization (i.e. the measures of effectiveness 320A-320F) is computed by summing the product of the weighted measure of effectiveness 304A and the weight 118G with the product of the weighted measure of effectiveness 304B and the weight 118H. As discussed above, the stakeholders 110C may specify the weights 118G and 118H. The stakeholders 110C may be the same or different stakeholders than the stakeholders 110A, 110B and 110D. For example, and without limitation, the stakeholders 110A, 110B, and 110D might be engineers while the stakeholders 110C are business executives. The stakeholders 110A-110E might also be other types of personnel in other embodiments.

In the example shown in FIG. 3A, a grand MOM 30 may be computed by summing the product of the weighted measure of effectiveness 304D and the weight 118K with the weighted measure of effectiveness 304C and the weight 118L. In this example, the weights 118 and 118L may be specified by different stakeholders 110E than the stakeholders 110A, 110B, 110C, and 110D. For example, the weights 118K and 118L might be specified by one or more stakeholders 110E that are high-level business executives or other type of high-level personnel tasked with supervising the operation of the distributed application 106.

As described above, a grand MOM 306 might be computed for each of the candidate sets of application parameter values 120 using the multi-attribute utility rollup shown in FIG. 3A. The optimization system 306 may then select a candidate set of application parameter values 120 having the highest grand MOM 306 as the optimized set of application parameter values 104 for deployment to the distributed application 106 in the production execution environment 108. In this regard, it should be appreciated that the multi-attribute utility rollup operation shown in FIG. 3A is merely illustrative and that other configurations might be defined by the shareholders 110 and utilized to compute a grand MOM 306 for candidate sets of application parameter values 120.

As shown in FIG. 3B, a great-grand MOM 308 might be computed in some embodiments. As illustrated in FIG. 3B, the great-grand MOM 308 might be computed by summing the product of two or more grand MOMs 306A-306C and a corresponding weight 118M-118O. As in the example shown in FIG. 3B, the weights 118M-118O might be specified by some of the stakeholders 110 shown in FIG. 3A or might be specified by a different group of stakeholders 110F. The stakeholders 110F, for example, might be at an even higher level in an organization than the stakeholders 110 shown in FIG. 3A. The great-grand MOM 308 might also be utilized in the selection of the optimized set of application parameter values 104.

Figure 4:
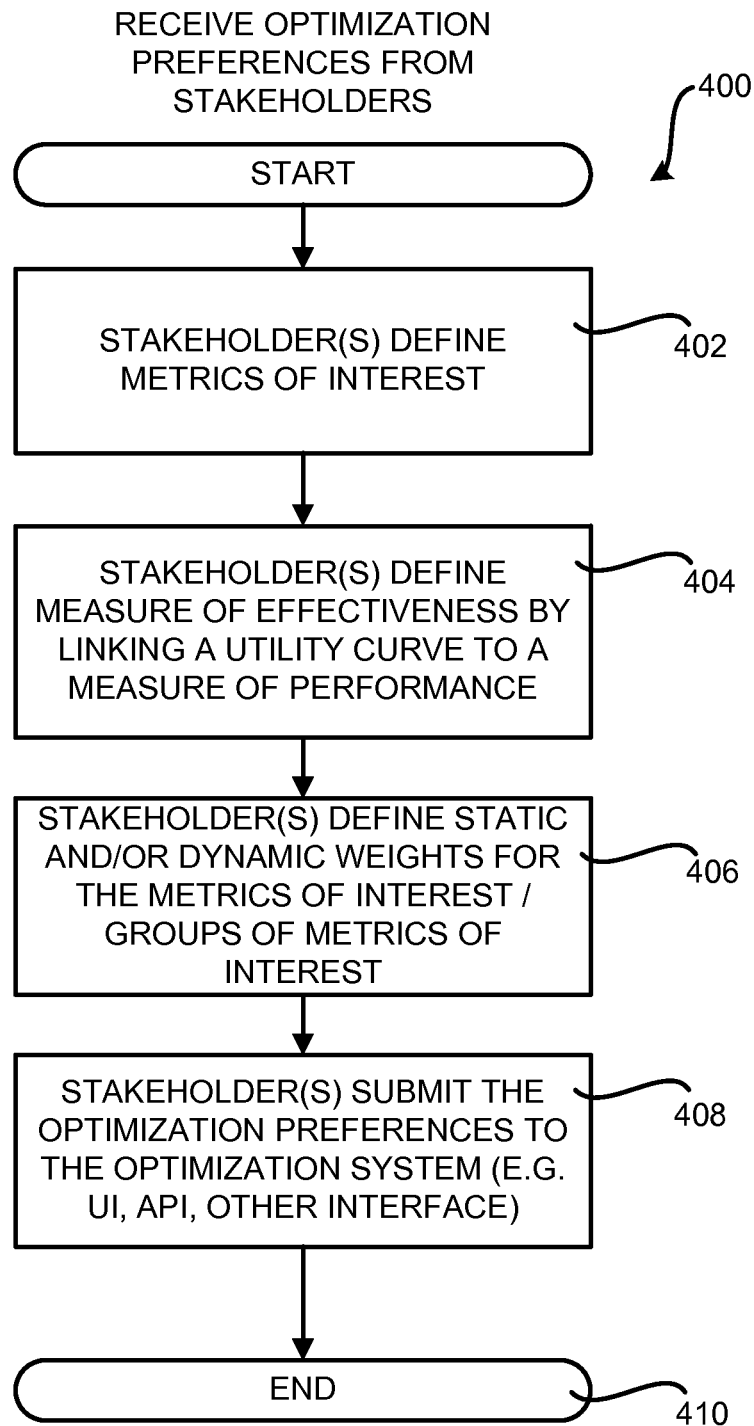
FIG. 4 is a flow diagram showing one illustrative routine for receiving optimization preferences defining aspects of the manner in which execution of a distributed application is to be optimized, according to one embodiment disclosed herein.

Turning now to FIG. 4, additional details will be provided regarding one illustrative process disclosed herein for optimizing the execution of a distributed application 106 by computing an optimized set of application parameter values 104. It should be appreciated that the logical operations described herein with respect to FIG. 4 and the other FIGS. are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein.

FIG. 4 is a flow diagram showing one illustrative routine 400 for receiving optimization preferences 112 defining aspects of the manner in which execution of a distributed application 106 is to be optimized, according to one embodiment disclosed herein. As mentioned above, an appropriate UI, API, or other type of interface might be provided through which the stakeholders 110 can define the optimization preferences 112. Additionally, it should be appreciated that the specific optimization preferences 112 described herein are merely illustrative and that other optimization preferences 112 might be specified and utilized by the optimization system 102 in other embodiments. Moreover, and as discussed above with regard to FIG. 1, a preference generation component 115 might also define and/or modify the optimization preferences 112 in some embodiments. The optimization preferences 112 generated by the preference generation component 115 might be utilized in addition to or instead of optimization preferences 112 supplied by the stakeholders 110.

The routine 400 begins at operation 402, where the stakeholders 110 define the metrics of interest 114. The routine 400 then proceeds to operation 404, where the stakeholders 110 may define a measure of effectiveness by linking a utility curve 116 to a measure of performance. In this way, the stakeholders 110 may define different measures of effectiveness that use the same measure of performance and different utility curves 116. Details regarding the specification of a utility curve 116 were provided above with regard to FIG. 2.

From operation 404, the routine 400 proceeds to operation 406, where the stakeholders 110 define static and/or dynamic weights 118 for the metrics of interest 114 specified at operation 404. The routine 400 then proceeds from operation 406 to operation 408, where the stakeholders 110 submit the specified optimization preferences 112 to the optimization system 102. As discussed above, an appropriate API, UI, or other type of interface may be exposed in order to permit the stakeholders 110 to submit the optimization preferences 112 to the optimization system 102. From operation 408, the routine 400 proceeds to operation 410, where it ends.

Figure 5:
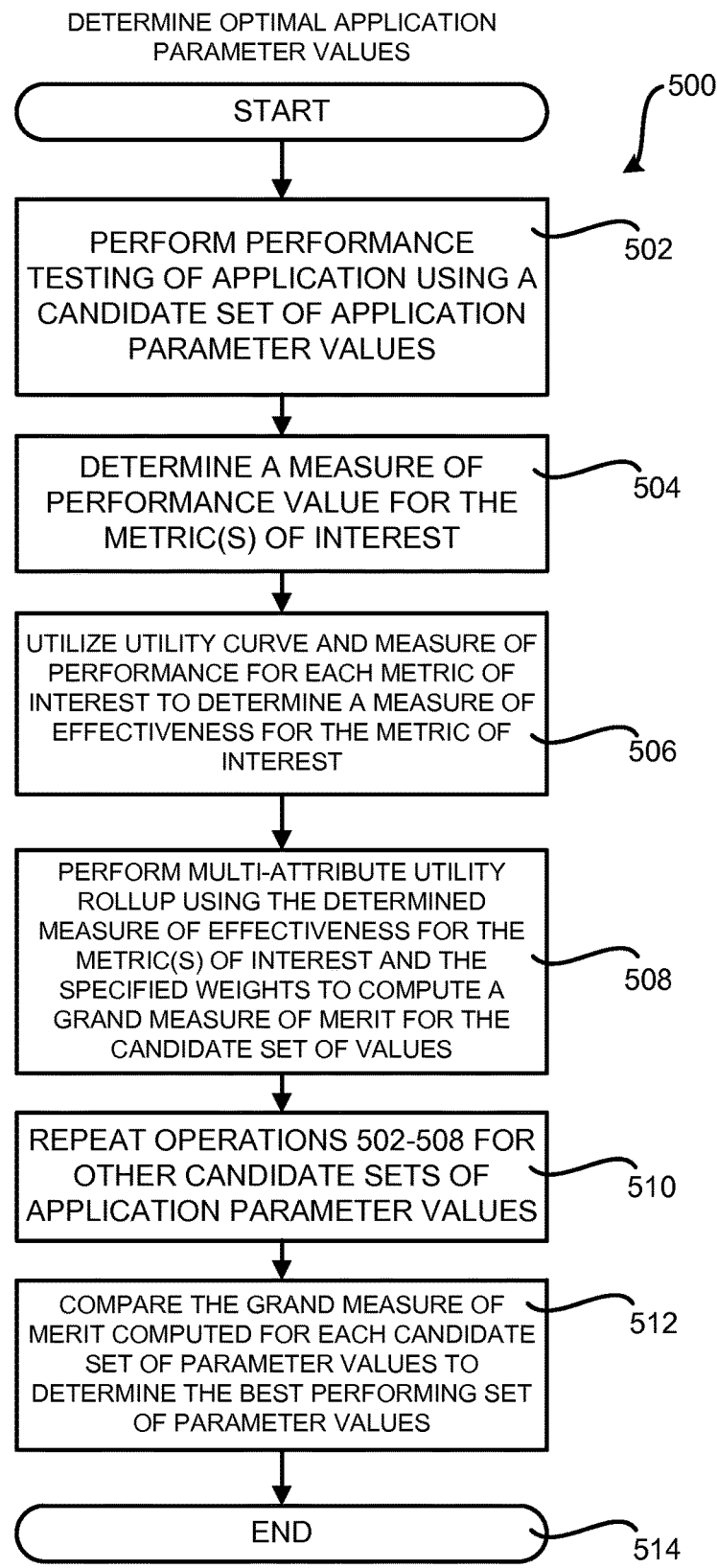
FIG. 5 is a flow diagram showing one illustrative routine for optimizing the execution of a distributed application by determining optimal application parameter values, according to one embodiment disclosed herein.

FIG. 5 is a flow diagram showing one illustrative routine for optimizing the execution of a distribution application 106 by determining a set of optimized application parameter values 104, according to one embodiment disclosed herein. The routine 500 beings at operation 502, where the optimization system 102 performs performance testing of a distributed application 106 using a candidate set of application parameter values 120. As discussed above, the testing might be performed in a test execution environment 122 provided by a PES platform in some embodiments. Another embodiment where testing may be performed in a production execution environment 108 is described below with regard to FIGS. 6A, 6B and 7.

From operation 502, the routine 500 proceeds to operation 504, where the optimization system observes a measure of performance for the metrics of interest 114. For example, the optimization system 102 might observe certain types of performance metrics relating to latency, CPU utilization, or memory utilization in the test execution environment 122. The routine 500 then proceeds from operation 504 to operation 506, where the optimization system 102 utilizes the utility curves 116 and the specified metric of performance for each metric of interest 114 to determine a measure of effectiveness 302 for the metrics of interest 114.

From operation 506, the routine 500 proceeds to operation 508, where the optimization system 102 performs a multi-attribute rollup operation, such as that illustrated in FIGS. 3A and 3B and described above, in order to compute a grand MOM 306 for the candidate set of application parameter values 120. The routine 500 then proceeds from operation 508 to operation 510, where the optimization system repeats operations 502-508 for other candidate sets of application parameter values 120 in order to compute grand MOMs 306 for the other candidate sets of application parameter values 120.

From operation 510, the routine 500 continues to operation 512, where the optimization system 102 compares the computed grand MOM 306 for each of the candidate sets of application parameter values 120 in order to select the optimized set of application parameter values 104. For example, the candidate set of application parameter values 120 having the highest grand MOM 306 might be selected as the optimized set of application parameter values 104. Once the optimization system 102 has selected the optimized set of application parameter values 104, the optimization system 102 might cause the optimized set of application parameter values 104 to be deployed to the production execution environment 108. From operation 512, the routine 500 proceeds to operation 514, where it ends.

FIGS. 6A and 6B are computer system diagrams illustrating aspects of one mechanism disclosed herein for identifying production safe application parameters 602 and for utilizing the identified production safe application parameters 602 to optimize the execution of a distributed application 106 in a production execution environment 108, respectively. As discussed briefly above, the process described herein for optimizing application parameter values for a distributed application 106 may be performed in a production execution environment 108 rather than a test execution environment 122. In order to provide this functionality and, at the same time, minimize the possibility of downtime for the distributed application 106 in the production execution environment 108, testing may first be performed in a test execution environment 122 as shown in FIG. 6A to identify one or more production safe application parameters 602 for the distributed application 106.

As discussed briefly above, production safe application parameters 602 are application parameters for which testing in the production execution environment 108 is considered to be safe (i.e. modification of values of the production safe application parameters is not likely to create a failure or otherwise negatively impact the operation of the distributed application 106 in a way that is unacceptable to the owner of the distributed application). For example, and without limitation, testing of application parameters in the test execution environment 122 might indicate that modification of a certain application parameter causes an unacceptable failure condition or unacceptably low performance for the distributed application 106. Consequently, this application parameter might be categorized as a "production unsafe"

application parameter for which optimization is not to be performed in the production execution environment 108. Other application parameters for which modification is not likely to cause an unacceptable failure condition or other type of unacceptable negative impact on the execution of the distributed application 106 may be considered production safe application parameters 602.

Bounds 604 of values for the production safe application parameters 602 might also be identified using a test execution environment 122 in some embodiments. As discussed above, the bounds 604 identify a range of application parameter values that are safe to be modified when testing a production safe application parameter 602 in a production execution environment 108. For example, the bounds 604 might identify a low value and a high value for a production safe application parameter 602. Optimization of the distributed application 106 by modification of the value of a production safe application parameter 602 between the low value and the high value may be considered safe. Utilization of application parameter values lower than the low value or higher than the high value may cause problems with the execution of the distributed application 106 in the production execution environment 108.

It should be appreciated that the production safe application parameters 602 and/or the bounds 604 might be maintained on per application, per software version, per customer or customer profile, or on another basis. Additionally, it should be appreciated that the production safe application parameters 602 and/or the bounds 604 might be initially set by a stakeholder 110, another user, or the preference generation component 115 and modified in the manner described below with regard to FIG. 6B.

The production safe application parameters 602 and/or the bounds 604 might also be initially set and/or modified in response to detection of an actual or anticipated event such as, but not limited to, an actual or anticipated spike in network traffic to the distributed application 106 or another type of actual or predicted event impacting the performance of the distributed application 106. The possibility of occurrence of such an event might be based upon historical data, such as a network traffic profile, describing similar events that have occurred in the past. Other types of data might also be utilized to identify an actual event and/or predict the future occurrence of an event impacting the performance of the distributed application 106. Other actions might also be taken in response to the identification of such an event.

Once the production safe application parameters 602 and the bounds 604 have been identified, optimization may be performed in the manner described above in the production execution environment 108 rather than in a test execution environment 122, as shown in FIG. 6B. In some embodiments, the results of such testing might impact how optimized application parameter values 104 are deployed to host computers and/or virtual machine instances executing the distributed application in the production execution environment 108. For example, if testing indicates that a set of application parameter values provides a positive impact on the execution of the distributed application 106, then that set of application parameters might be deployed to additional host computers and/or virtual machine instances as testing progresses. On the other hand, if the testing of a set of application parameter values indicates a negative influence on some aspect of the operation of the distributed application 106, deployment of the application parameter values might be rolled back, and further optimization might be discontinued or other types of corrective actions might be taken.

Figure 7:
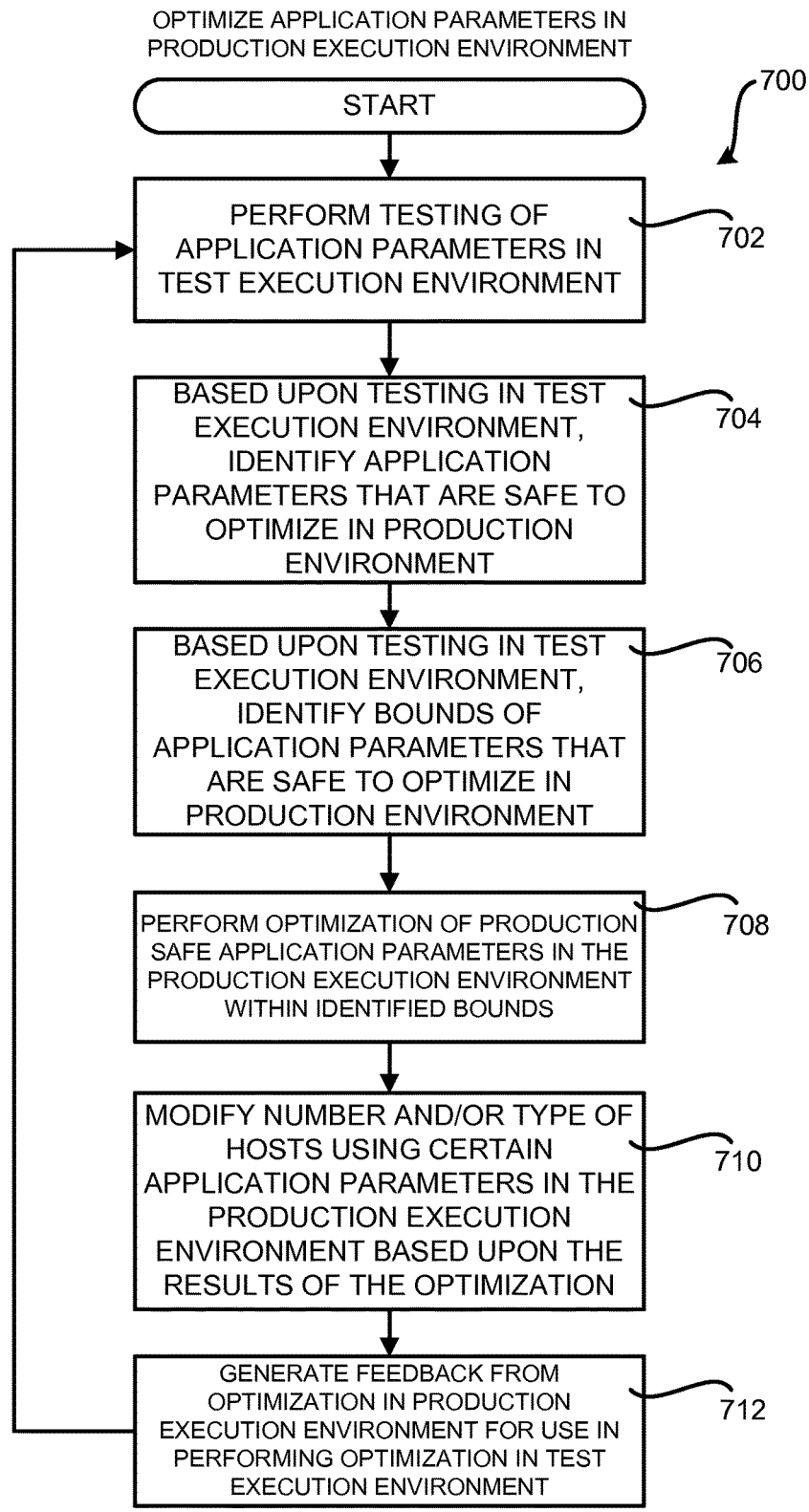
FIG. 7 is a flow diagram showing one illustrative routine for identifying production safe application parameters and for utilizing the identified production safe application parameters to optimize the execution of a distributed application within a production execution environment, according to one embodiment disclosed herein.

FIG. 7 is a flow diagram showing one illustrative routine for identifying production safe application parameters 602 and for utilizing the identified production safe application parameters 602 to optimize the execution of a distributed application 106 in a production execution environment 108, according to one embodiment disclosed herein. The routine 700 begins at operation 702, where testing of application parameters is performed for the distributed application 106 in a test execution environment 122.

The routine 700 then proceeds from operation 702 to operation 704, where the optimization system 102 identifies production safe application parameters 602 based upon the execution of the distributed application 106 in the test execution environment 122. Application parameters that might cause problems with the execution of the distributed application 106 in the production execution environment 108 may be considered unsafe. Application parameters that are likely not to cause an unacceptable failure condition for the distributed application 106 in the production execution environment 108 may be considered production safe application parameters 602. From operation 704, the routine 700 proceeds to operation 706, where bounds 604 might be identified for the production safe application parameters 602 in a similar fashion.

From operation 706, the routine 700 proceeds to operation 708, where the optimization system 102 performs optimization of the distributed application 106 in the production execution environment 108 using the production safe application parameters 602 and the corresponding bounds 604. Based upon this testing, the routine 700 proceeds to operation 710 where the optimization system 102 might increase or decrease the number of host computers and/or virtual machine instances executing the distributed application 106 in the production execution environment 108 in the manner described above with regard to FIG. 6B. The optimization system 102 might also modify the type of host computers and/or virtual machine instances executing the distributed application 106 in the production execution environment 108.

From operation 710, the routine 700 proceeds to operation 172, where optimization of the distributed application 106 in the production execution environment 108 might also be utilized to generate feedback for use in optimizing the distributed application in the test execution environment 122. For example, and without limitation, the bounds 604 for a parameter might be modified if optimization of the distributed application 106 in the production execution environment 108 indicates that a value for the application parameter causes a problem with the execution of the distributed application 106.

From operation 712, the routine 700 proceeds back to operation 702, where some or all of the operations described above may be repeated. For example, and without limitation, testing might be continually performed in the test execution environment 122 in order to update the bounds 604 and/or the production safe application parameters 602 for the optimization processes utilized in the production execution environment 108.

Figure 8:
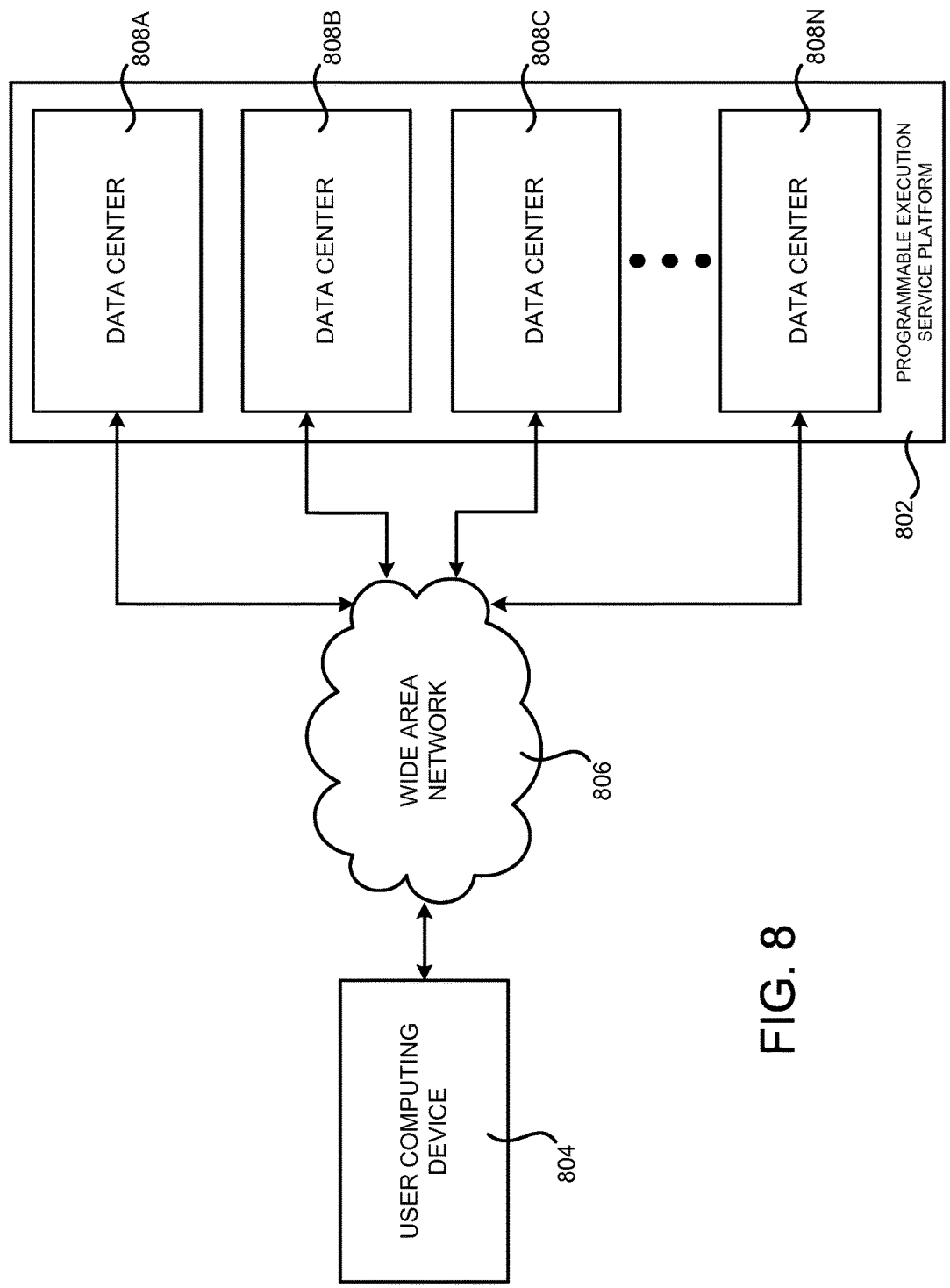
FIG. 8 is a system and network diagram showing aspects of one illustrative operating environment for a distributed application and for an optimization system disclosed herein for optimizing the execution of a distributed application.

FIG. 8 and the following description are intended to provide a brief, general description of a suitable computing environment in which the embodiments described herein may be implemented. In particular, FIG. 8 is a system and network diagram that shows an illustrative operating environment that includes a programmable execution service ("PES") platform 802 for executing a distributed application 106. The PES platform 802 may be utilized to implement the distributed application 106 and the optimization system 102 for generating optimized application parameter values for the distributed application 106 described above. It should be appreciated that the PES platform 802 provides one type of environment for executing the distributed application 106 and for implementing the optimization system 102. The distributed application 106 and/or the optimization system 102 might also be implemented on other platforms and in other environments in other implementations.

The PES platform 802 can provide computing resources for executing applications, such as the distributed application 106, on a permanent or an as-needed basis. The computing resources provided by the PES platform 802 may include various types of resources, such as data processing resources, data storage resources, data communication resources, and the like. Each type of computing resource may be general-purpose or may be available in a number of specific configurations. For example, data processing resources may be available as virtual machine instances ("instances"). Instances provided by the PES platform 802 may be configured to execute applications, including Web servers, application servers, media servers, database servers, services, and the like. Instances provided by the PES platform 802 might also provide various types of network services for use by the distributed application 106. The PES platform 802 might also provide data storage resources for use by the distributed application 106 including, but not limited to file storage devices, block storage devices, and the like.

Each type or configuration of computing resource provided by the PES platform 802 may be available in different sizes, such as large resources, consisting of many processors, large amounts of memory, and/or large storage capacity, and small resources consisting of fewer processors, smaller amounts of memory, and/or smaller storage capacity. The operator of the PES platform 802 and/or its customers may choose to allocate a number of small processing resources such as Web servers and/or one large processing resource as a database server, for example. The various processing resources provided by the PES platform 802 and described above may be utilized to implement the distributed application 106 and the various optimization mechanisms described above. In particular, the PES platform 802 might be utilized to provide the production execution environment 108 and the test execution environments 122 described above. The PES platform 802 might also be utilized to execute software components for implementing the optimization system 102.

The computing resources provided by the PES platform 802 may be enabled by one or more data centers 808A-808N (which may be referred herein singularly as "a data center 808" or in the plural as "the data centers 808"). The data centers 808 are facilities utilized to house and operate computer systems and associated components. The data centers 808 typically include redundant and backup power, communications, cooling, and security systems. The data centers 808 might also be located in geographically disparate locations. One illustrative configuration for a data center 808 that implements the concepts and technologies disclosed herein for optimizing the execution of a distributed application will be described below with regard to FIG. 9.

The customers and other users of the PES platform 802 may access the computing resources provided by the data centers 102 over a wide-area network ("WAN") 806. Although a WAN 806 is illustrated in FIG. 8, it should be appreciated that a local-area network ("LAN"), the Internet, or any other networking topology known in the art that connects the data centers 808 to remote users may be utilized. It should also be appreciated that combinations of such networks might also be utilized.

The user computing device 804 is a computer utilized by a customer or other user of the PES platform 802. For instance, the user computing device 804 may be a server computer, a desktop or laptop personal computer, a tablet computer, a wireless telephone, a personal digital assistant ("PDA"), an e-reader, a game console, a set-top box, or any other computing device capable of accessing the PES platform 802.

The user computing device 804 may be utilized to access and configure aspects of the computing resources provided by the PES platform 802. In this regard, the PES platform 802 might provide a Web interface through which aspects of its operation may be configured through the use of a Web browser application program executing on the user computing device 804. Alternatively, a stand-alone application program executing on the user computing device 804 might access an application programming interface ("API") exposed by the PES platform 802 for performing configuration operations. Other mechanisms for configuring the operation of the PES platform 802, including optimizing the execution of an application, might also be utilized.

According to embodiments disclosed herein, the capacity of purchased computing resources provided by the PES platform 802 can be scaled in response to demand or other factors. In this regard, scaling refers to the process of instantiating (which may also be referred to as "launching" or "creating") or terminating (which may also be referred to as "de-scaling") instances of computing resources in response to demand. In this manner, the capacity of resources purchased by a customer or resources used by the operator of the PES platform 802 can be scaled on-demand.

Auto scaling is one mechanism for scaling computing resources in response to increases or lulls in demand for the resources. Auto scaling allows customers of the PES platform 802 to configure the platform 802 to scale their purchased computing resources according to conditions defined by the customer. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand.

The PES platform 802 might also be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts and/or other types of code to be executed in new instances, provide cache warming logic specifying how an application cache should be prepared, and other types of information. The deployment component utilizes the customer-provided configuration and cache warming logic to launch, configure, and prime new instances of computing resources.

The PES platform 802 might also be configured with an optimization component 102 for optimizing the execution of a distributed application 106 executing on the PES platform 802. The use of the optimization system 102 might be provided as a free or paid service to customers of the PES platform 802. The owner and/or operator of the PES platform 802 might also utilize the optimization system 102 to optimize the execution of various types of applications executed by the owner and/or operator of the PES platform 802. For example, in one particular implementation, the owner of the PES platform 802 provides computing resources to customers in the manner described above. The owner of the PES platform 802 also utilizes the PES platform 802 to operate a large-scale high-availability distributed application 106 for providing e-commerce functionality. The optimization system 102 described above may be utilized to optimize various aspects of the operation of such a distributed e-commerce application in one implementation. The optimization system 102 may, of course, also be utilized to optimize the execution of other types of applications.

Figure 9:
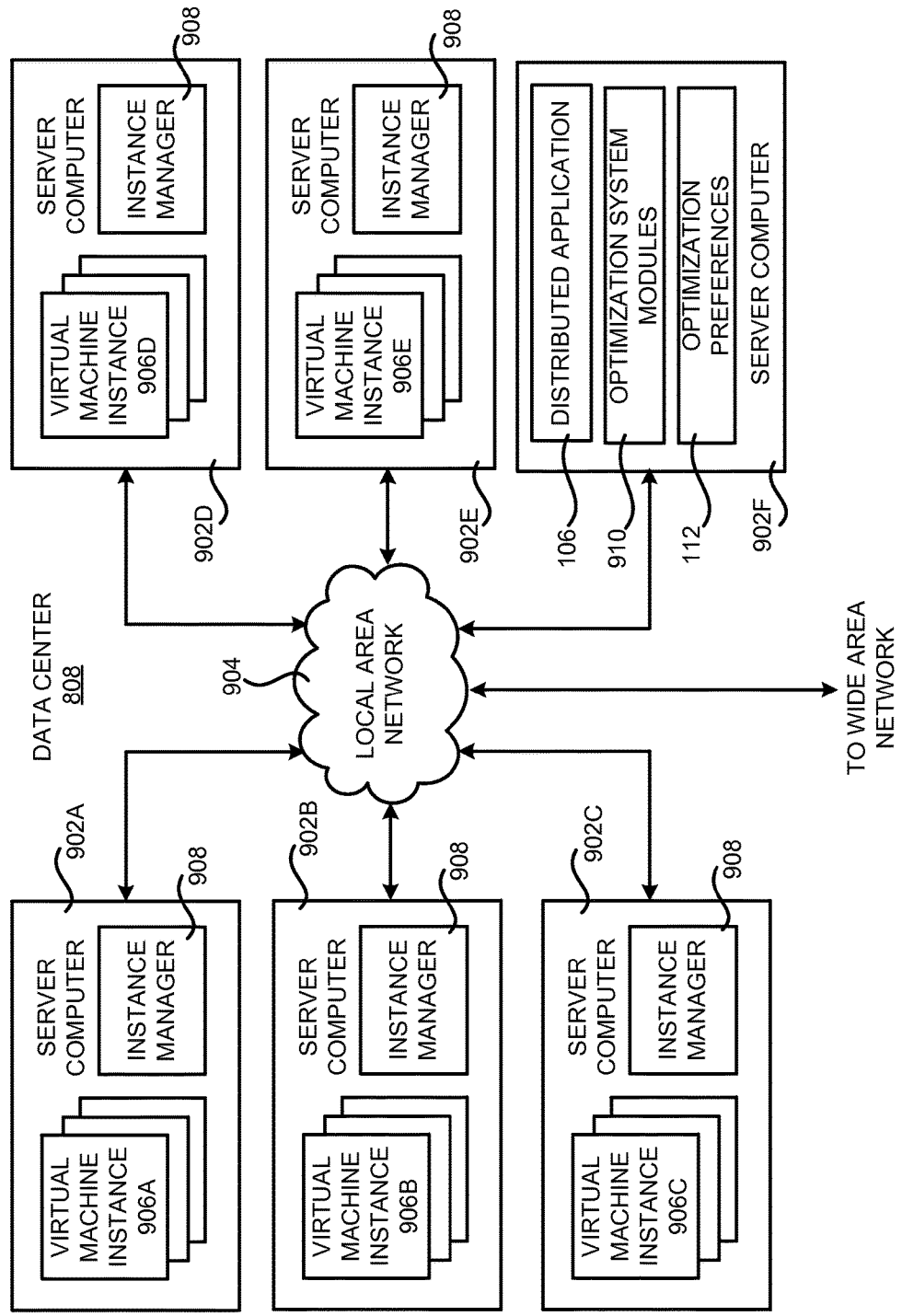
FIG. 9 is a computing system diagram that illustrates a configuration for a data center that implements the concepts and technologies disclosed herein for optimizing the execution of a distributed application, according to one embodiment.

FIG. 9 is a computing system diagram that illustrates one configuration for a data center 808 that implements a PES platform 802, including an implementation of the concepts and technologies disclosed herein for optimizing the execution of a distributed application 106 executing on the PES platform 802. The example data center 808 shown in FIG. 9 includes several server computers 902A-902F (which may be referred herein singularly as "a server computer 902" or in the plural as "the server computers 902") for providing computing resources for executing a distributed application. The server computers 902 may be standard server computers configured appropriately for providing the computing resources described above.

In one implementation, the server computers 902 are configured to provide virtual machine instances 906A-906E. As known in the art, a virtual machine instance is an instance of a software implementation of a machine (i.e. a computer) that executes programs like a physical machine. In the example of virtual machine instances, each of the servers 902 may be configured to execute an instance manager 908 capable of executing the instances 906. The instance manager 908 might be a hypervisor or another type of program configured to enable the execution of multiple instances 906 on a single server 902, for example. As discussed above, each of the instances 906 may be configured to execute all or a portion of an application.

It should be appreciated that although the embodiments disclosed herein are described primarily in the context of virtual machine instances, other types of computing resources can be utilized with the concepts and technologies disclosed herein. For instance, the technologies disclosed herein might be utilized with storage resources, data communications resources, and with other types of computing resources. The embodiments disclosed herein might also execute all or a portion of a distributed application 106 directly on the hardware of a computer system, such as the server computers 902, without utilizing virtual machine instances.

The data center 808 shown in FIG. 9 may also include a server computer 902F that executes some or all of the software components described above. For example, and without limitation, the server computer 902F may execute all or a portion of the distributed application 106. The server computer 902F might also be configured to execute optimization system modules 910 for providing the functionality of the optimization system 102 described above. The server computer 902F might also store or have access to the optimization preferences 112 that are consumed by the optimization system 102 described above.

It should be appreciated that the optimization system modules 910 may execute on a single server computer 902 or in parallel across multiple server computers 902 in the PES platform 802. In addition, the optimization system 102 may be implemented as a number of subcomponents executing on different server computers 902 or other computing devices in the PES platform 802. The functionality provided by the optimization system 102 may be implemented as software (i.e. the optimization system modules 910), hardware, or any combination of the two.

In the example data center 808 shown in FIG. 9, an appropriate LAN 904 is utilized to interconnect the server computers 902A-902F. The LAN 904 is also connected to the WAN 806 illustrated in FIG. 8. In this regard, it should be appreciated that the network topology illustrated in FIGS. 8 and 9 has been greatly simplified and that many more networks and networking devices may be utilized to interconnect the various computing systems disclosed herein. Appropriate load balancing devices or software modules might also be utilized for balancing a load between each of the data centers 808A-808N, between each of the server computers 902A-902F in each data center 808, and between instances 906 purchased by customers of the PES platform 802. These network topologies and devices should be apparent to those skilled in the art. It should also be appreciated that the data center 808 described in FIG. 9 is merely illustrative and that other implementations might be utilized.

Figure 10:
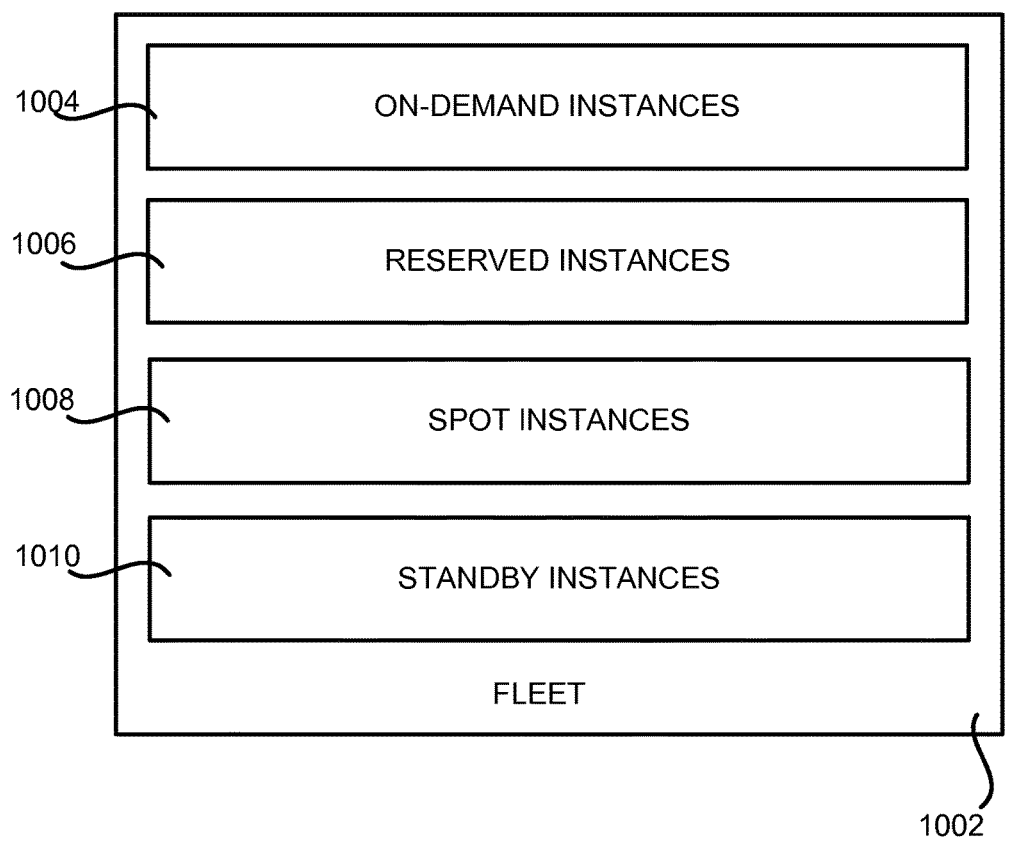
FIG. 10 is a block diagram illustrating various types of instances of computing resources that might be found in a fleet utilized to implement a distributed application, according to embodiments disclosed herein.

FIG. 10 is a block diagram illustrating several types of virtual machine instances that might be utilized in a fleet 1002 to implement a distributed application 106, according to embodiments disclosed herein. As used herein, the term "fleet" refers to a collection of instances utilized to implement a distributed application 106 in the PES platform 802. As shown in FIG. 10, the instances provided by the PES platform 802 may be on-demand instances 1004, reserved instances 1006, spot instances 1008, and standby instances 1010. Other types of instances not shown in FIG. 10 or described herein might also be utilized to implement a distributed application 106.

The on-demand instances 1004, which might also be referred to herein as "regular" instances, are instances that are paid for and in active use. The on-demand instances 1004 allow customers of the PES platform 802 to pay for capacity per unit of time, such as an instance-hour, without requiring a long-term commitment. This frees the customer from the costs and complexities of planning, purchasing, and maintaining hardware and transforms what are commonly large fixed costs into much smaller variable costs.

The reserved instances 1006 are instances of a computing resource that are reserved in exchange for a payment. The reserved instances 1006 provide the customer the option to make a one-time payment for each instance they want to reserve. In turn, the customer may receive a significant discount on the hourly usage charge for the reserved instances 1006 as compared to the on-demand instances 1004. After a customer makes a one-time payment for the reserved instances 1006, the reserved instances 1006 are reserved for the customer and the customer has no further obligation. The customer may choose to run the reserved instances 1006 for the discounted usage rate for the duration of a chosen term. If the customer does not use the reserved instances 1006, the customer will not pay usage charges on these instances.

The spot instances 1008 allow customers to bid on unused capacity in the PES platform 802. The customer can run the spot instances 1008 for as long as their bid exceeds a current market price, referred to herein as the spot instance market price, which may fluctuate based upon supply and demand. The spot instances 1008 may be terminated if a customer's maximum bid no longer exceeds the current spot instance market price.

In order to obtain the spot instances 1008, the customer places a request for the spot instances 1008 that specifies the desired number of spot instances 1008 and the maximum price the customer is willing to pay per instance hour. If the customer's maximum price bid exceeds the current spot instance market price for the spot instances 1008, the customer's request will be fulfilled and the customer's spot instances 1008 will run until either the customer chooses to terminate them or the market price increases above the customer's maximum price (whichever is sooner). Various components operating within the PES platform 802 may manage the market for the spot instances 1008, including setting the current spot instance market price for the spot instances 1008.

The standby instances 1010 are spot instances 1008 that have been acquired on behalf of a customer and that are made ready for near immediate use by the customer in the manner described herein. The price charged for the standby instances 1010 is typically less than the price charged for the on-demand instances 1004, since the standby instances 1010 may be terminated in the same manner as the spot instances 1008. In one embodiment, the standby instances 1010 are priced higher than the spot instances 1008 and the reserved instances 1006, but lower than the on-demand instances 1004. It should be appreciated, however, that the various pricing mechanisms described above for the on-demand instances 1004, reserved instances 1006, spot instances 1008, and standby instances 1010 are merely illustrative and that other mechanisms may be utilized to set the pricing for the various instance types.

Previously it may have been difficult for customers of the PES platform 802 to utilize spot instances 1008 because their application might not be optimized for use with various types of spot instances 1008 available through the spot market. Through the use of the concepts and technologies disclosed herein, however, a customer of the PES platform 802 might generate sets of optimized application parameter values 104 for many different sizes and types of instances. When spot instances 1008 are available from the spot market at a price that is attractive to the customer, the customer can purchase the spot instances 1008 and utilize previously generated optimized values corresponding to the purchased spot instances 1008 to execute the customer's distributed application 106 in an optimized fashion. In this manner, the technologies disclosed herein might permit greater access to the spot market for certain types of customers of the PES platform 802.

Figure 11:
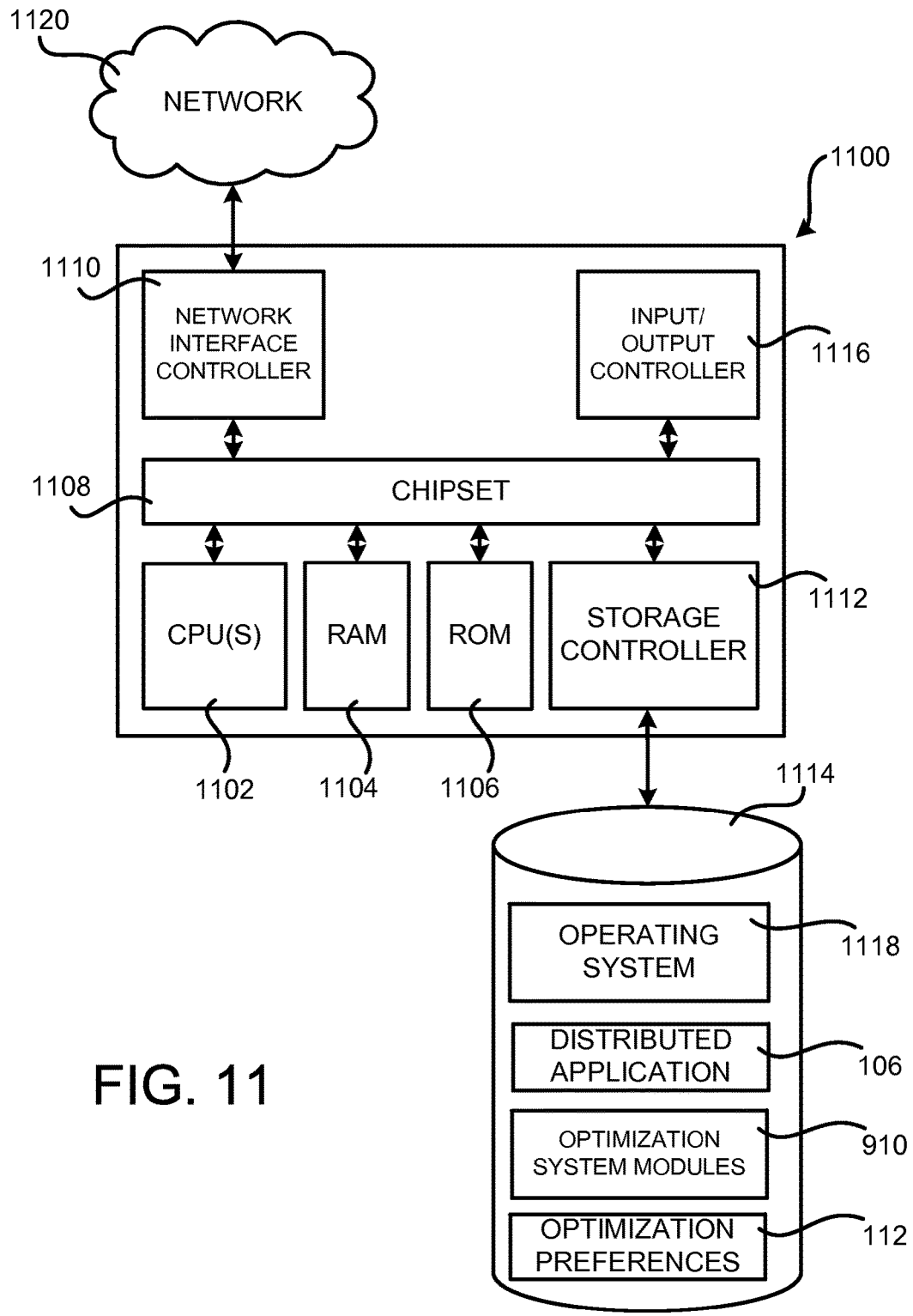
FIG. 11 is a computer architecture diagram showing an illustrative computer hardware architecture for implementing a computing device for executing the various software components described in embodiments presented herein.

FIG. 11 shows an example computer architecture for a computer 1100 capable of executing the software components described above. The computer architecture shown in FIG. 11 illustrates a conventional server computer, workstation, desktop computer, laptop, network appliance, personal digital assistant ("PDA"), e-reader, digital cellular phone, or other computing device, and may be utilized to execute any aspects of the software components presented herein described as executing within the data centers 808A-808N, on the server computers 902A-202F, on the user computing device 804, or on any other computing system mentioned herein.

The computer 1100 includes a baseboard, or "motherboard," which is a printed circuit board to which a multitude of components or devices may be connected by way of a system bus or other electrical communication paths. In one illustrative embodiment, one or more central processing units ("CPUs") 1102 operate in conjunction with a chipset 1108. The CPUs 1102 are standard programmable processors that perform arithmetic and logical operations necessary for the operation of the computer 1100.

The CPUs 1102 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1108 provides an interface between the CPUs 1102 and the remainder of the components and devices on the baseboard. The chipset 1108 may provide an interface to a random access memory ("RAM") 1104, used as the main memory in the computer 1100. The chipset 1108 may further provide an interface to a computer-readable storage medium such as a read-only memory ("ROM") 1106 or non-volatile RAM ("NVRAM") for storing basic routines that that help to startup the computer 1100 and to transfer information between the various components and devices. The ROM 1106 or NVRAM may also store other software components that facilitate the operation of the computer 1100 in accordance with the embodiments described herein.

The computer 1100 may operate in a networked environment using logical connections to remote computing devices and computer systems through the network 1120. The chipset 1108 may include functionality for providing network connectivity through a network interface controller ("NIC") 1110, such as a gigabit Ethernet adapter. The NIC 1110 is capable of connecting the computer 1100 to other computing devices over the network 1120. It should be appreciated that multiple NICs 1110 may be present in the computer 1100, connecting the computer to other types of networks and remote computer systems.

The computer 1100 may be connected to a mass storage device 1114 that provides non-volatile storage for the computer. The mass storage device 1114 may store system programs, application programs, other program modules, and data, which have been described in greater detail herein. The mass storage device 1114 may be connected to the computer 1100 through a storage controller 1112 connected to the chipset 1108. The mass storage device 1114 may consist of one or more physical storage units. The storage controller 1112 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1100 may store data on the mass storage device 1114 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1114 is characterized as primary or secondary storage, and the like.

For example, the computer 1100 may store information to the mass storage device 1114 by issuing instructions through the storage controller 1112 to alter the magnetic characteristics of a particular location within a magnetic disk drive unit, the reflective or refractive characteristics of a particular location in an optical disk, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 may further read information from the mass storage device 1114 by detecting the physical states or characteristics of one or more particular locations within the physical storage units.

In addition to the mass storage device 1114 described above, the computer 1100 may have access to other computer-readable storage medium to store and retrieve information, such as program modules, data structures, or other data. It should be appreciated by those skilled in the art that computer-readable storage media can be any available media that provides for the storage of non-transitory data and that may be accessed by the computer 1100. By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory devices, compact disc ROM ("CD-ROM"), digital versatile disk ("DVD"), high definition DVD ("HD-DVD"), BLU-RAY, or other types of optical disks, magnetic cassettes, magnetic tape, magnetic disk storage or other magnetic storage devices, or any other medium that can be used to store the desired information in a non-transitory fashion.

The mass storage device 1114 may store an operating system 1118 utilized to control the operation of the computer 1100. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or OSX operating systems. It should be appreciated that other operating systems may also be utilized. The mass storage device 1114 may store other system or application programs and data utilized by the computer 1100, such as all or a portion of the distributed application 106, optimization system modules 910 for implementing aspects of the optimization system 102, the optimization preferences 112, and/or any of the other programs and/or data described above.

In one embodiment, the mass storage device 1114 or other computer-readable storage media is encoded with computer-executable instructions which, when loaded into the computer 1100, transforms the computer from a general-purpose computing system into a special-purpose computer capable of implementing the embodiments described herein. These computer-executable instructions transform the computer 1100 by specifying how the CPUs 1102 transition between states, as described above. According to one embodiment, the computer 1100 has access to computer-readable storage media storing computer-executable instructions which, when executed by the computer 1100, perform the routines 400, 500 and 700, described above.

The computer 1100 may also include an input/output controller 1116 for receiving and processing input from a number of input devices, such as a keyboard, a mouse, a touchpad, a touch screen, an electronic stylus, or other type of input device. Similarly, the input/output controller 1116 may provide output to a display, such as a computer monitor, a flat-panel display, a digital projector, a printer, a plotter, or other type of output device. It will be appreciated that the computer 1100 may not include all of the components shown in FIG. 11, may include other components that are not explicitly shown in FIG. 11, or may utilize an architecture completely different than that shown in FIG. 11.

Based on the foregoing, it should be appreciated that technologies for optimizing the execution of a distributed application have been presented herein. Although the embodiments described above have been described primarily in the context of a distributed application, it should be appreciated that the concepts disclosed herein might also be utilized to generate optimized parameters for other types of applications. Additionally, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A non-transitory computer-readable storage medium having computer-executable instructions stored thereupon which, when executed by a computer, cause the computer to:

receive, from a first computing device associated with a first stakeholder, first optimization preferences identifying one or more first metrics of interest for a distributed application, wherein the first optimization preferences are associated with at least one utility curve for the first metrics of interest that defines a relationship between a measure of performance and a measure of effectiveness, and one or more weights indicating a weighting associated with the measures of effectiveness for the first metrics of interest:

receive, from a second computing device associated with a second stakeholder, second optimization preferences identifying one or more second metrics of interest for a distributed application:

generate a plurality of candidate sets of application parameter values for the distributed application;

for the plurality of candidate sets of application parameter values, configure the distributed application to utilize one of the plurality of candidate sets of application parameter values, determine a measure of performance for the first metrics of interest and the second metrics of interest based at least in part upon execution of the distributed application utilizing the one of the plurality of candidate sets of application parameter values, utilize the at least one utility curve to compute a measure of effectiveness for the first metrics of interest, and perform a multi-attribute utility rollup operation utilizing the computed measure of effectiveness and the one or more weights to generate a first grand measure of merit for the one of the plurality of candidate sets of application parameter values;

select an optimized set of application parameter values from the plurality of candidate sets of application parameter values based, at least in part, upon a comparison of the first grand measure of merit computed for the one of the plurality of candidate sets of application parameter values and a second grand measure of merit computed for a second one of the plurality of candidate sets of application parameter values; and cause the distributed application to be configured to utilize the optimized set of application parameter values.

2. The non-transitory computer-readable storage medium of claim 1, wherein the optimization preferences are generated by a preference generation component.

3. The non-transitory computer-readable storage medium of claim 1, wherein the measure of performance is determined based at least in part upon execution of the distributed application in a test execution environment, and wherein the distributed application is configured to utilize the optimized set of application parameter values in a production execution environment.

4. The non-transitory computer-readable storage medium of claim 1, wherein the application parameter values comprise values for one or more production safe application parameters, and wherein the measure of performance for the metrics of interest is based at least in part upon execution of the distributed application utilizing the one of the plurality of candidate sets of application parameter values in the production execution environment.

5. The non-transitory computer-readable storage medium of claim 4, wherein the production safe application parameters are identified using a test execution environment.

6. The non-transitory computer-readable storage medium of claim 5, wherein one or more bounds for the production safe application parameters are identified using the test execution environment, and wherein the plurality of candidate sets of application parameter values are selected based, at least in part, upon the identified bounds for the production safe application parameters.

7. A system for optimizing execution of a distributed application, the computer system comprising:
one or more computers executing the distributed application; and
one or more computers configured to optimize the execution of the distributed application by
generating a first candidate set of application parameter values for the distributed application,
generating a second candidate set of application parameter values for the distributed application,
configuring the distributed application to use the first candidate set and the second candidate set of application parameter values,
computing a first measure of effectiveness for one or more metrics of interest for the distributed application based at least in part upon execution of the distributed application using the first candidate set of application parameter values,
computing a second measure of effectiveness for one or more metrics of interest for the distributed application based at least in part upon execution of the distributed application using the second candidate set of application parameter value,
performing a multi-attribute utility rollup operation to generate a first grand measure of merit for the first candidate set and a second grand measure of merit for the second candidate set of application parameter values, and
selecting an optimized set of application parameter values from the first candidate set of application parameter values and the second candidate set of application parameters based, at least in part, upon a comparison of the first grand measure of merit and the second grand measure of merit, and
causing the application to be configured to utilize the optimized set of application parameter values.

8. The system of claim 7, wherein the multi-attribute utility rollup operation utilizes the computed measures of effectiveness and one or more weights to generate the first grand measure of merit and the second grand measure of merit.

9. The system of claim 8, wherein one or more of the first measure of effectiveness or the second measure of effectiveness is computed using a utility curve that defines a relationship between a measure of performance for a metric of interest and the measure of effectiveness.

10. The system of claim 9, wherein the metrics of interest, the utility curve, the measure of performance, the first measure of effectiveness and the second measure of effectiveness, and the one or more weights are supplied by a preference generation component.

11. The system of claim 7, wherein the first and second measures of effectiveness for the one or more metrics of interest for the distributed application are computed based at least in part upon execution of the distributed application using the candidate sets of application parameter values in a test execution environment, and wherein the optimized set of application parameter values is deployed to a production execution environment executing the distributed application.

12. The system of claim 7, wherein the application parameter values comprise values within bounds for production safe application parameters, and wherein the first and second measures of effectiveness for the one or more metrics of interest for the distributed application are computed based at least in part upon execution of the distributed application in the production execution environment.

13. A computer-implemented method for optimizing the execution of an application, the method comprising performing computer implemented operations for:
generating candidate sets of application parameter values for the application;
for the candidate sets of application parameter values,
configuring the application to use the candidate sets of application parameter values,
computing a first and second measure of effectiveness for one or more metrics of interest for the application based at least in part upon execution of the application using the candidate sets of application parameter values, and
performing a multi-attribute utility rollup operation to generate grand measures of merit for the plurality of candidate sets of application parameter values; and
selecting an optimized set of application parameter values from the at least one candidate sets of application parameter values based, at least in part, upon a comparison of the first and second grand measures of merit, and
causing the application to be configured to utilize the optimized set of application parameter values.

14. The computer-implemented method of claim 13, wherein the multi-attribute utility rollup operation utilizes the computed measures of effectiveness and one or more weights to generate the grand measures of merit.

15. The computer-implemented method of claim 14, wherein the measure of effectiveness is computed using a utility curve that defines a relationship between a measure of performance for a metric of interest and the measure of effectiveness.

16. The computer-implemented method of claim 15, wherein the metrics of interest, the utility curve, the measure of performance, the measure of effectiveness, and the one or more weights are provided by a preference generation component.

17. The computer-implemented method of claim 13, wherein the measures of effectiveness for the one or more metrics of interest for the application are computed based at least in part upon execution of the application using the at least one candidate set of application parameter values in a test execution environment, and wherein the optimized set of application parameter values is deployed to a production execution environment executing the application.

18. The computer-implemented method of claim 13, wherein the application parameter values comprise values for production safe application parameters, and wherein the optimized set of application parameter values is deployed for use by the application when executing in the production execution environment.

\* \* \* \* \*